US012785059B2

(12) United States Patent
Byeon et al.

(10) Patent No.: US 12,785,059 B2
(45) Date of Patent: Nov. 3, 2026

(54) ELECTRODE, METHOD FOR PREPARING SAME, AND ELECTROSTATIC DISCHARGE SYSTEM COMPRISING SAME

(71) Applicant: Industry Academic Cooperation Foundation of Yeungnam University, Gyeongsangbuk-do (KR)

(72) Inventors: Jeong Hoon Byeon, Gyeongsangbuk-do (KR); Jae Ho Oh, Seoul (KR)

(73) Assignee: Industry Academic Cooperation Foundation of Yeungnam University, Gyeongsan-si (KR)

( * ) Notice: Subject to any disclaimer, the term of this patent is extended or adjusted under 35 U.S.C. 154(b) by 309 days.

(21) Appl. No.: 18/686,421

(22) PCT Filed: Jul. 26, 2022

(86) PCT No.: PCT/KR2022/010996

§ 371 (c)(1),
(2) Date: Feb. 25, 2024

(87) PCT Pub. No.: WO2023/027358

PCT Pub. Date: Mar. 2, 2023

(65) Prior Publication Data

US 2024/0387791 A1 Nov. 21, 2024

(30) Foreign Application Priority Data

Aug. 25, 2021 (KR) ........................ 10-2021-0112629
Jul. 26, 2022 (KR) ........................ 10-2022-0092791

(51) Int. Cl.
*B01D 53/02* (2006.01)
*H01M 4/04* (2006.01)
(Continued)

(52) U.S. Cl.
CPC ......... *H01M 4/0402* (2013.01); *H01M 4/583* (2013.01); *B03C 3/40* (2013.01); *H01M 2004/021* (2013.01)

(58) Field of Classification Search
CPC ......... B03C 2201/10; B03C 3/40; B03C 3/41; B03C 3/60; H01M 2004/021; H01M 4/0402; H01M 4/583
See application file for complete search history.

(56) References Cited

U.S. PATENT DOCUMENTS 7,459,839 B2 * 12/2008 Tolt ......................... H01J 9/025 313/310
11,670,761 B1 * 6/2023 Song ....................... H01M 4/72 429/218.1
(Continued)

FOREIGN PATENT DOCUMENTS

CA 2898030 2/2016
CN 1599165 3/2005
(Continued)

OTHER PUBLICATIONS

Supplementary Partial European Search Report and the European Search Opinion Dated Jul. 30, 2025 From the European Patent Office Re. Application No. 22861570.4. (12 Pages).
(Continued)

*Primary Examiner* — Christopher P Jones

(57) ABSTRACT

The present application relates to an electrode, a method for preparing the electrode, and an electrostatic discharge system comprising the electrode. According to the electrode, the method for preparing the electrode, and the electrostatic discharge system comprising the electrode of the present application, the electrostatic discharge system exhibits an excellent anion generation concentration, maintains a residual ozone concentration of an indoor threshold or
(Continued)

lower, prevents the corrosion of the electrode, and may exhibit excellent antimicrobial performance.

25 Claims, 23 Drawing Sheets

(51) Int. Cl.

| | |
|---|---|
| ***H01M 4/583*** | (2010.01) |
| *B03C 3/40* | (2006.01) |
| *H01M 4/02* | (2006.01) |

(56) References Cited

U.S. PATENT DOCUMENTS

| | | | | |
|---|---|---|---|---|
| 2005/0074674 | A1* | 4/2005 | Boone | H01M 10/24 429/185 |
| 2006/0144812 | A1 | 7/2006 | Imada | |
| 2006/0197018 | A1 | 9/2006 | Chen | |
| 2008/0176030 | A1* | 7/2008 | Fonash | H10K 30/87 428/119 |
| 2008/0257156 | A1 | 10/2008 | Furukawa et al. | |
| 2010/0283375 | A1 | 11/2010 | Yang et al. | |
| 2011/0023955 | A1* | 2/2011 | Fonash | B82Y 20/00 136/256 |
| 2019/0207218 | A1* | 7/2019 | Zheng | C23C 18/405 |
| 2023/0111815 | A1* | 4/2023 | Amini | A61L 31/16 424/409 |

FOREIGN PATENT DOCUMENTS

| | | |
|---|---|---|
| CN | 2812353 | 8/2006 |
| CN | 101207265 | 6/2008 |
| CN | 202513447 | 10/2012 |
| KR | 10-2005-0098567 | 10/2005 |
| KR | 10-2007-0114735 | 12/2007 |
| KR | 10-2015-0108286 | 9/2015 |
| WO | WO 2017/061735 | 4/2017 |
| WO | WO 2023/027358 | 3/2023 |

OTHER PUBLICATIONS

International Search Report and the Written Opinion Dated Nov. 14, 2022 From the International Searching Authority Re. Application No. PCT/KR2022/010996 and Its Translation of Search Report Into English. (11 Pages).

Notice of Opinion Submission Dated Feb. 14, 2024 From the Korean Intellectual Property Office Re. Application No. 10-2022-0092791. (5 Pages).

Jiang et al. "Negative Air Ions and Their Effects on Human Health and Air Quality Improvement", International Journal of Molecular Sciences, 19(10): 2966-1-2966-19, Sep. 28, 2018.

Notification of Office Action and Search Report Dated Mar. 13, 2026 From The State Intellectual Property Office of People's Republic of China Re. Application No. 202280057837.2. (9 Pages).

* cited by examiner

[Figure 1]
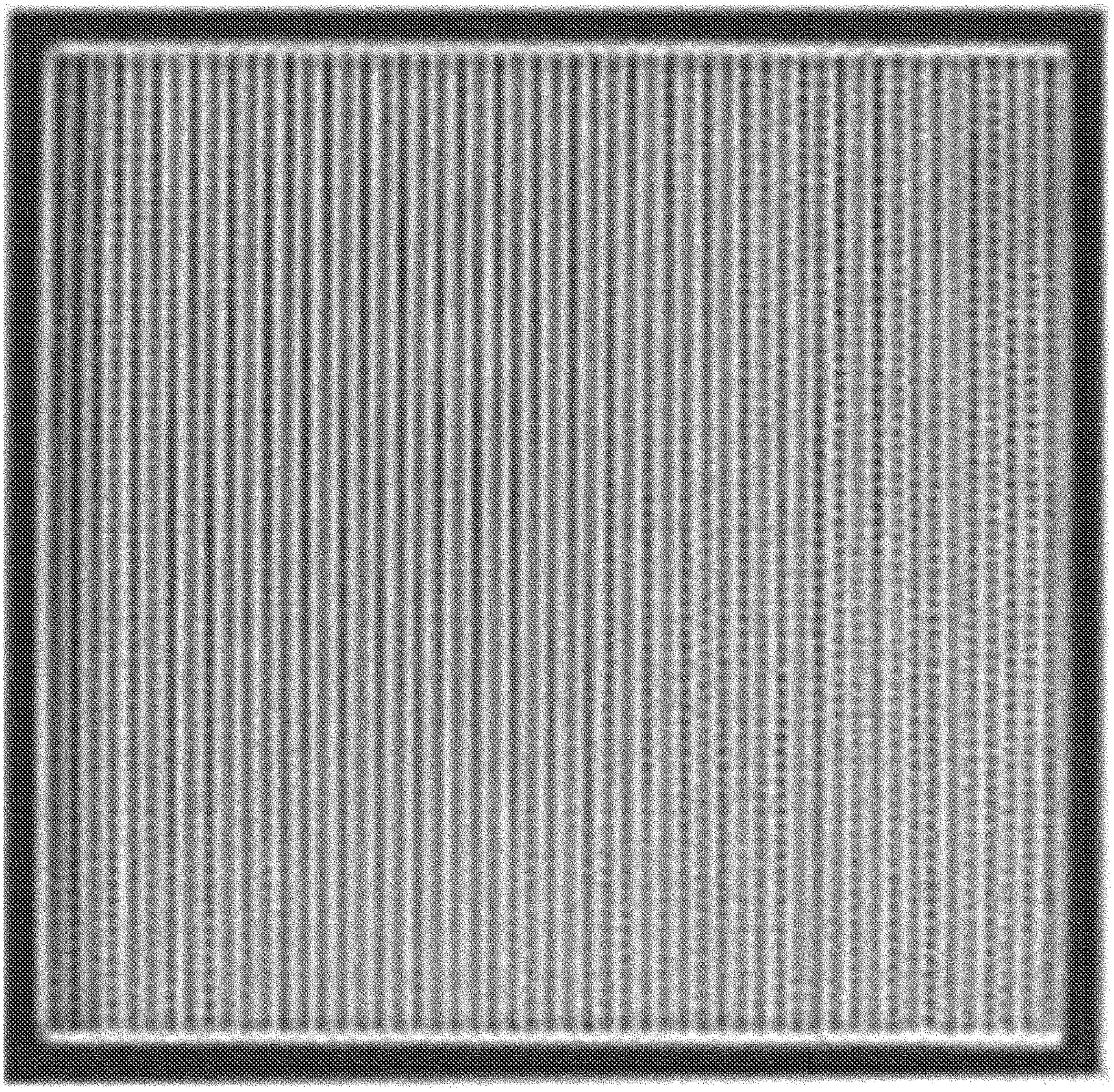

[Figure 2]

[Figure 3]
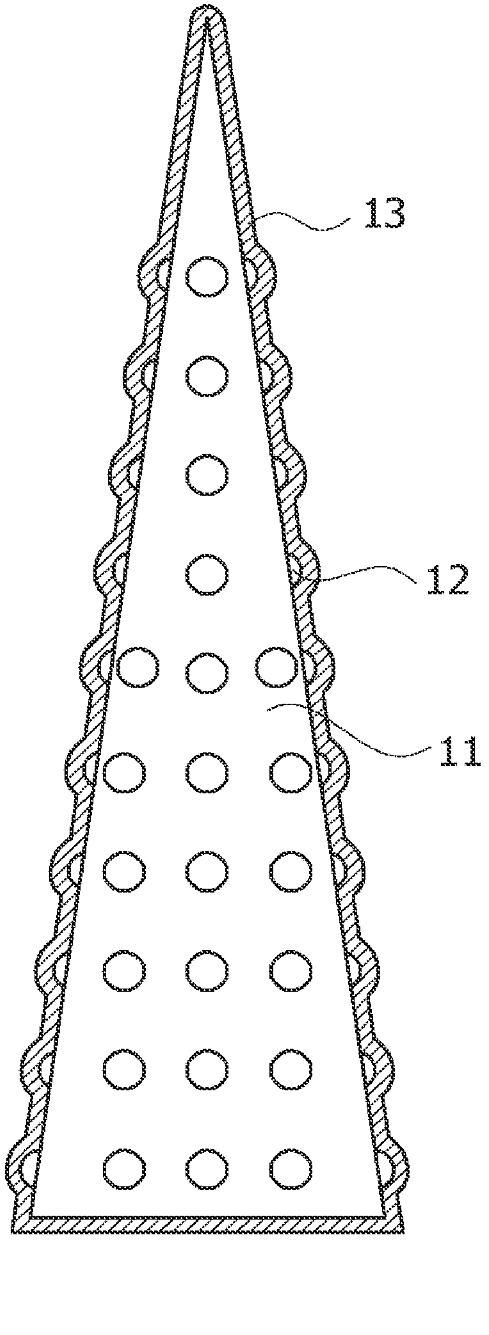

[Figure 4]
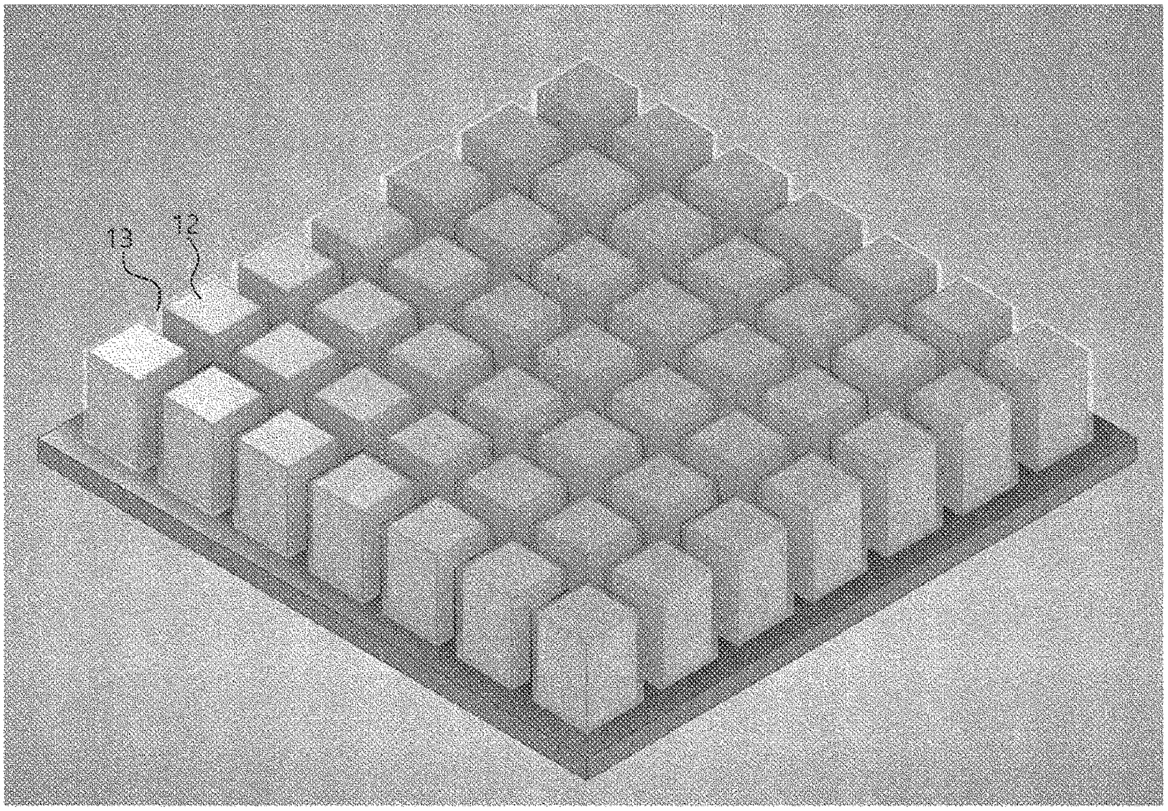

[Figure 5]
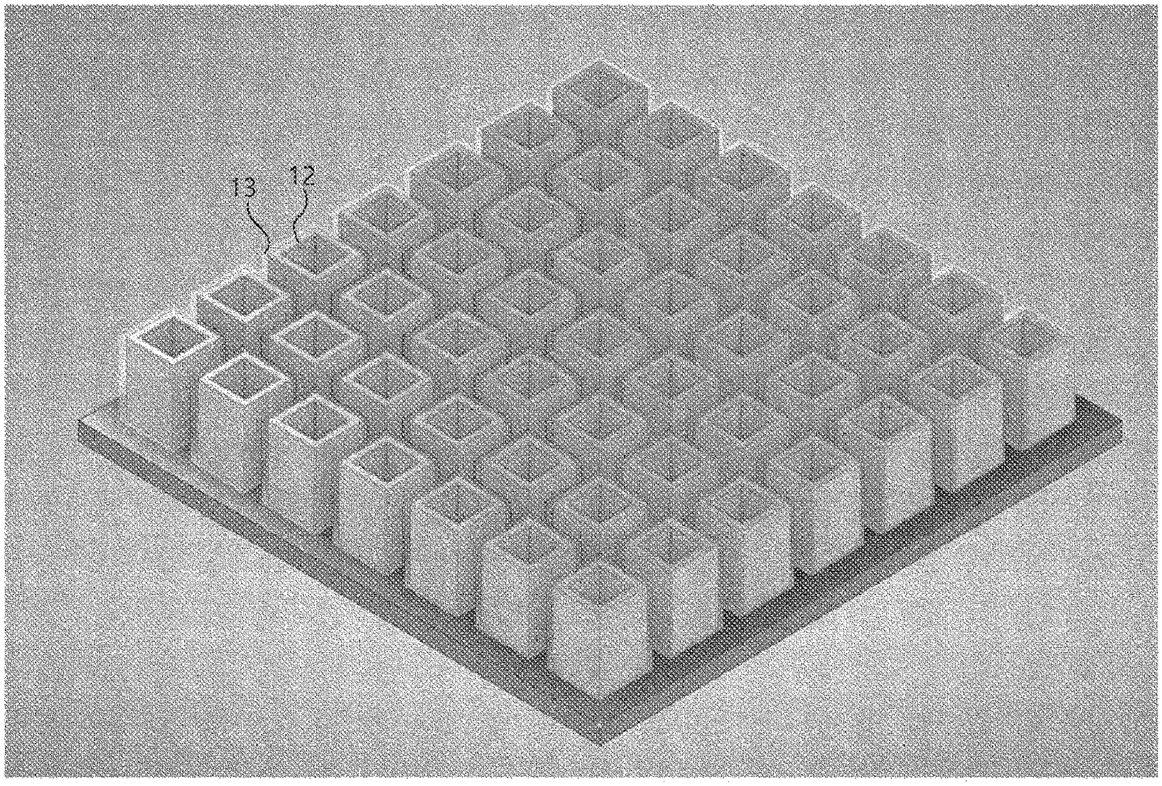

[Figure 6]
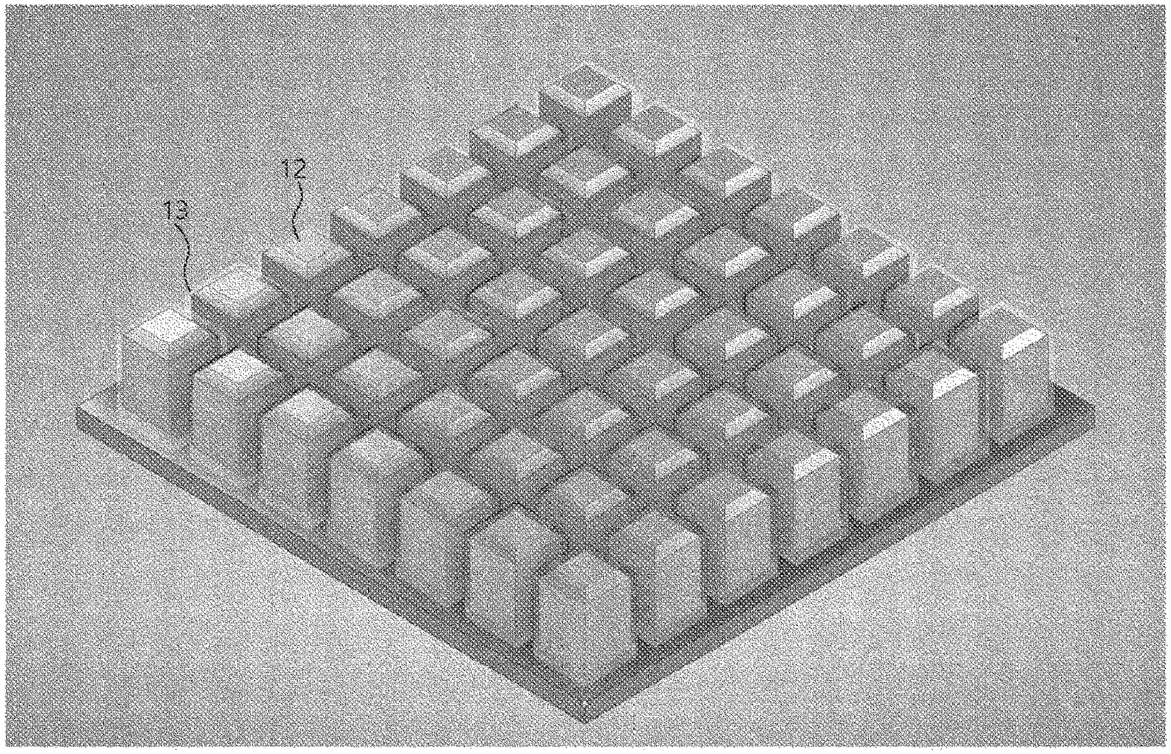

[Figure 7]
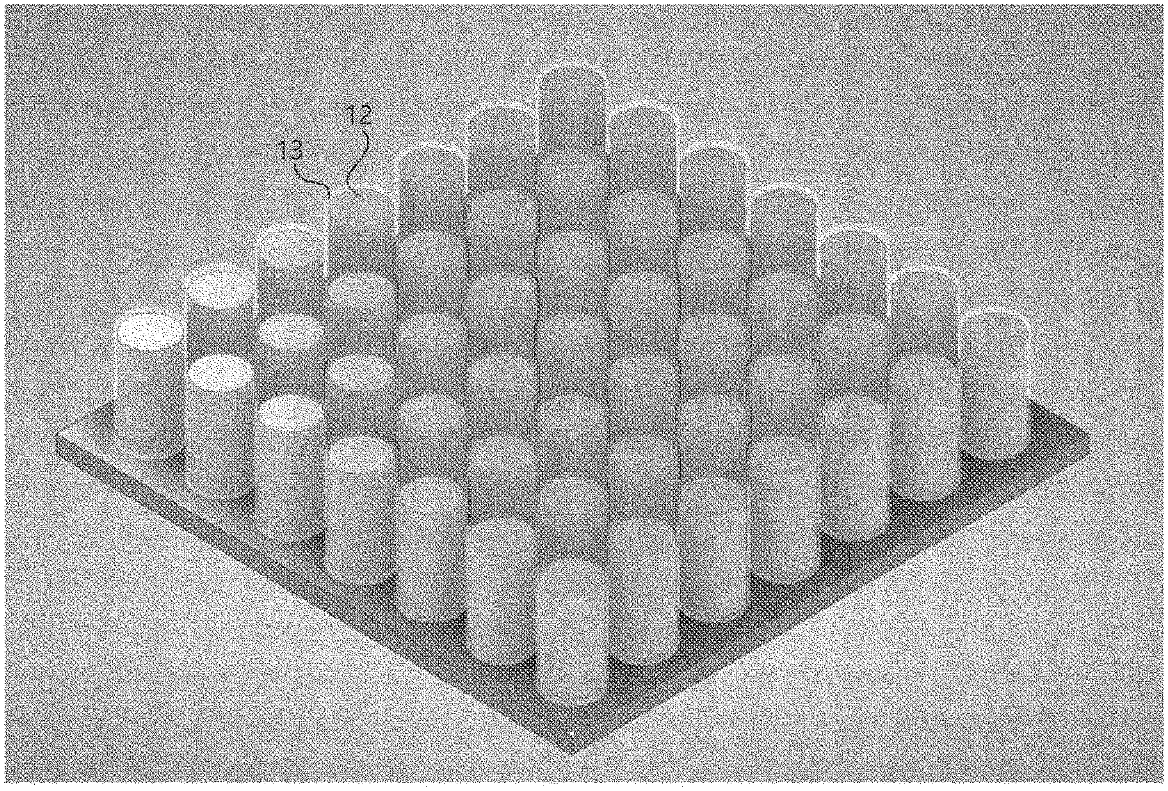

[Figure 8]
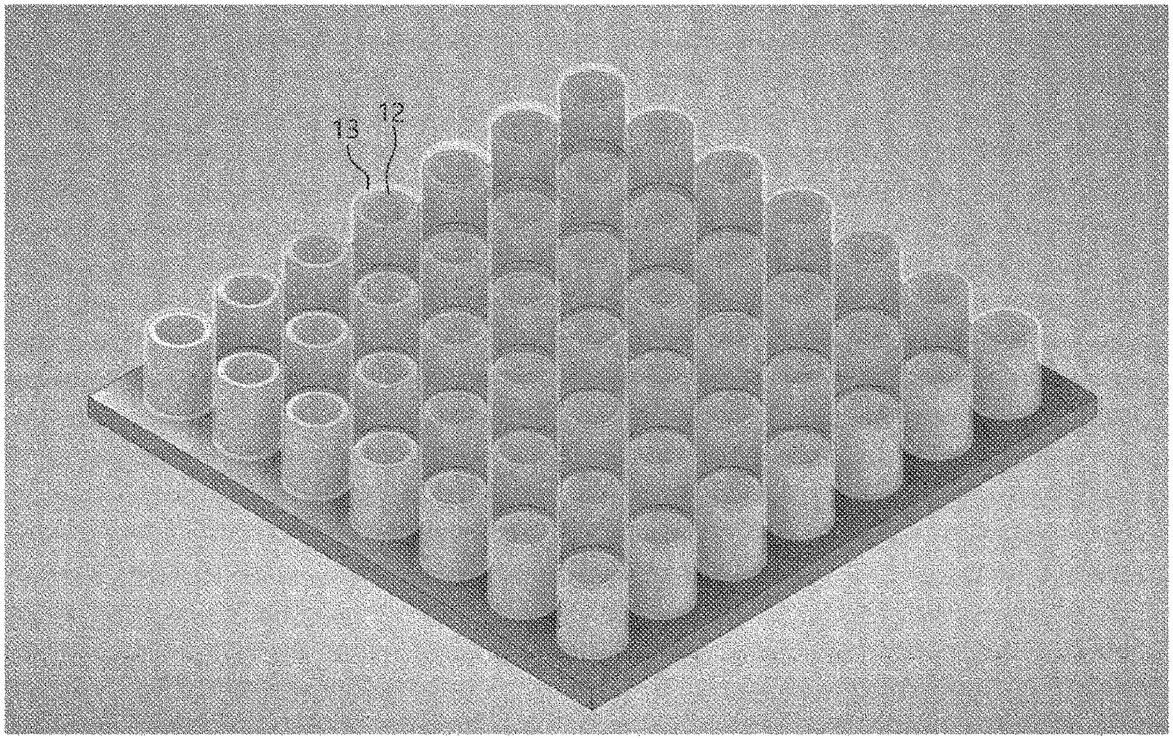

[Figure 9]
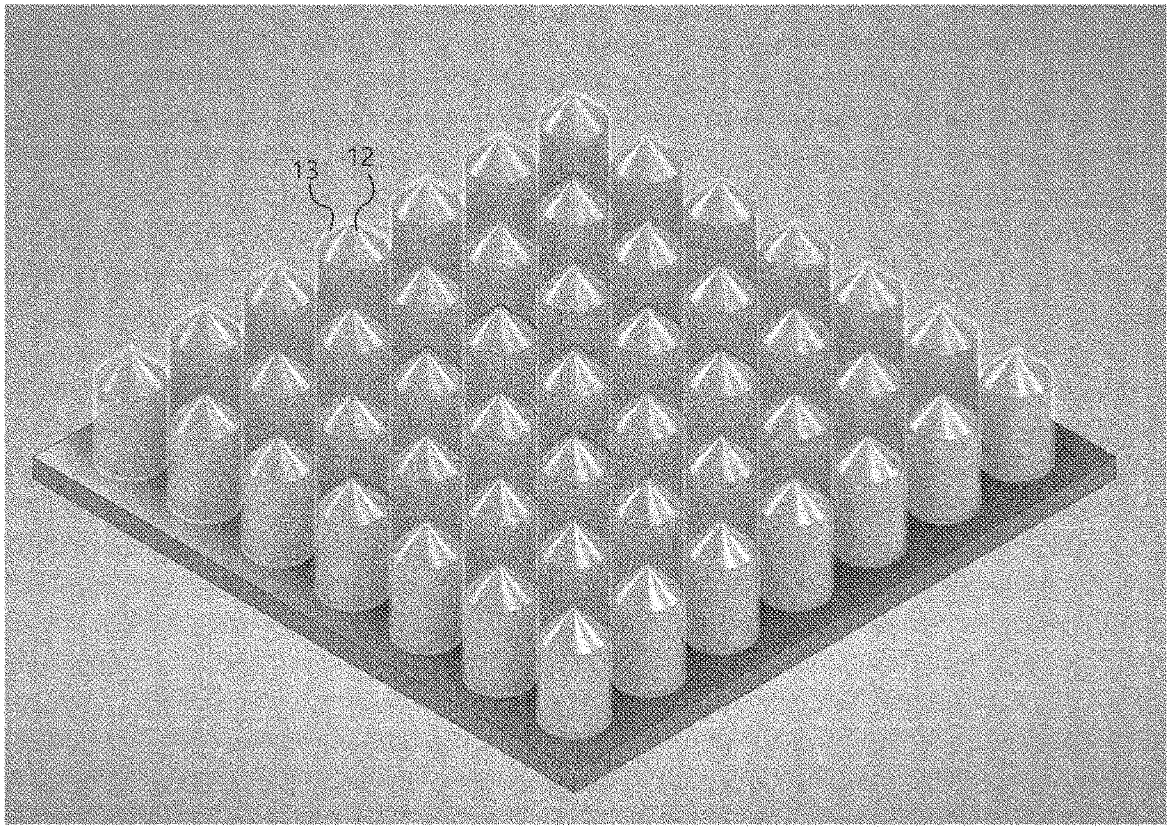

[Figure 10]
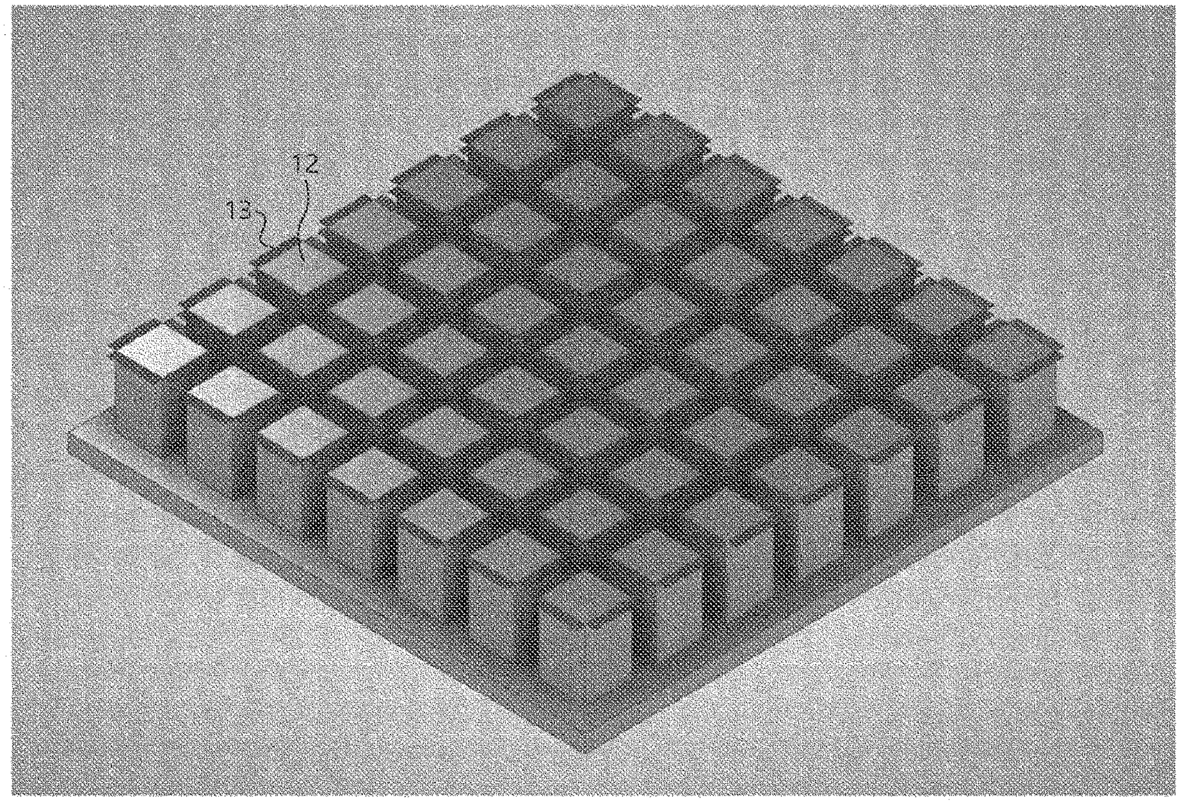

[Figure 11]
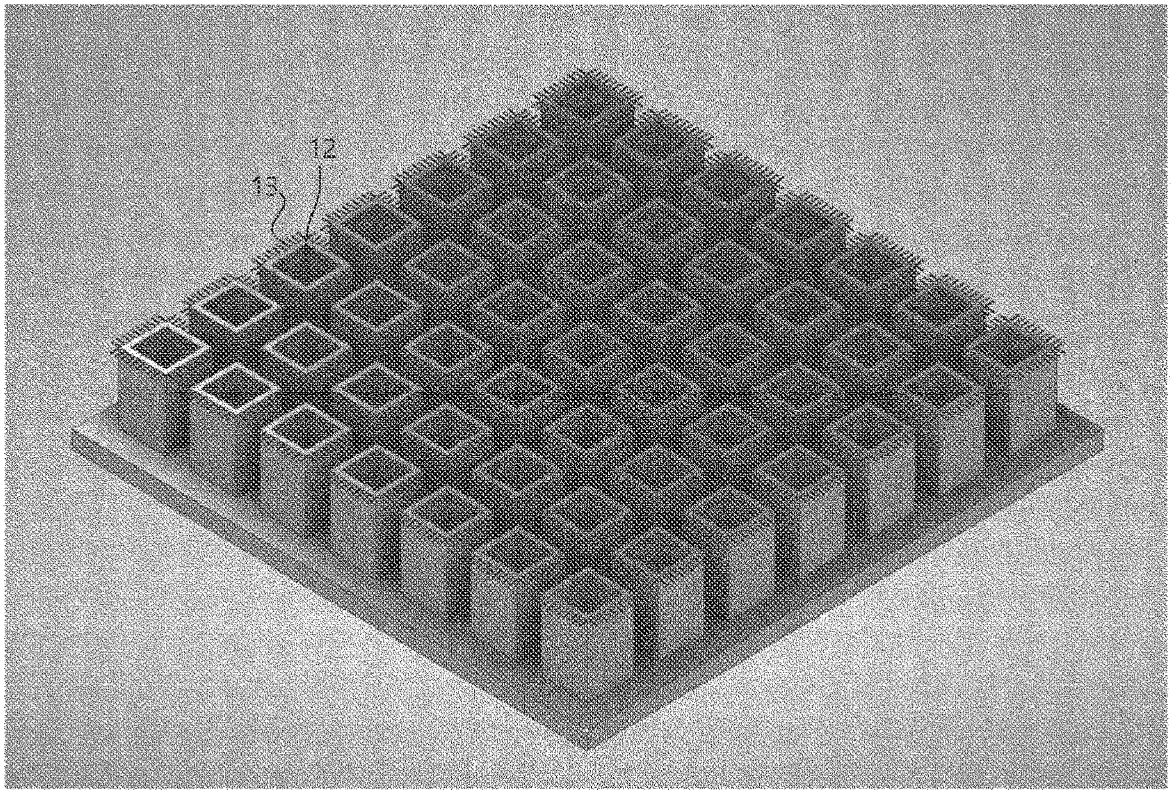

[Figure 12]
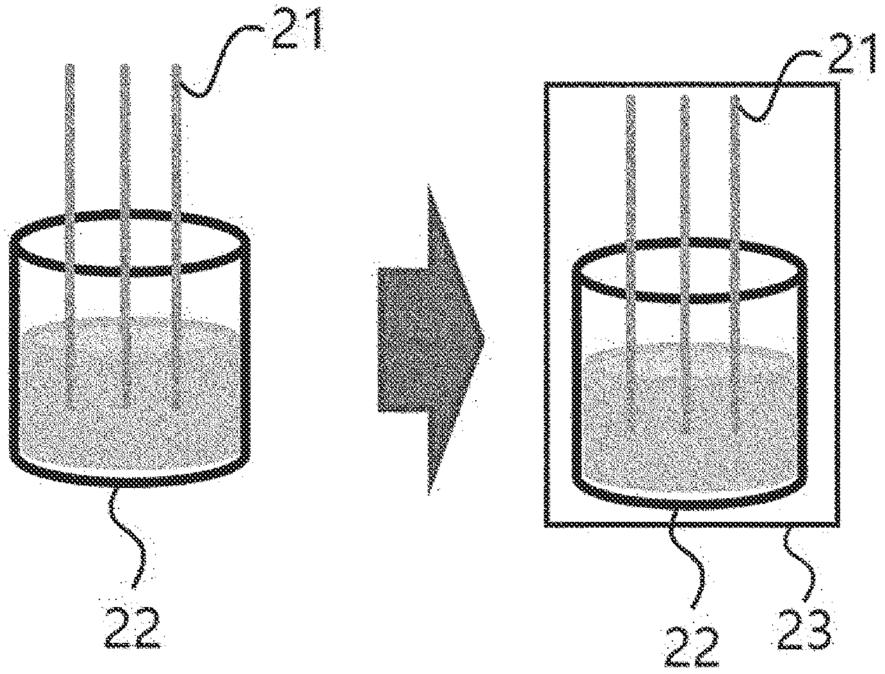

[Figure 13]
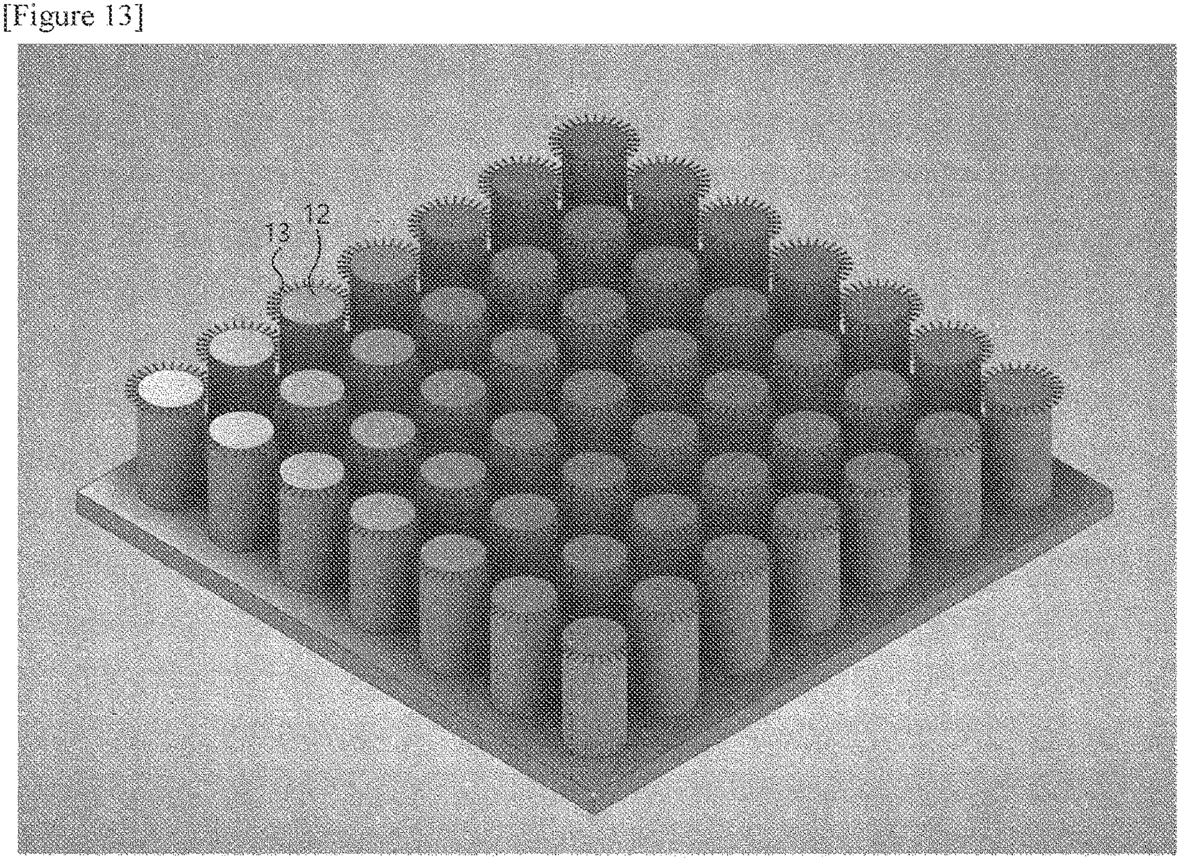

[Figure 14]
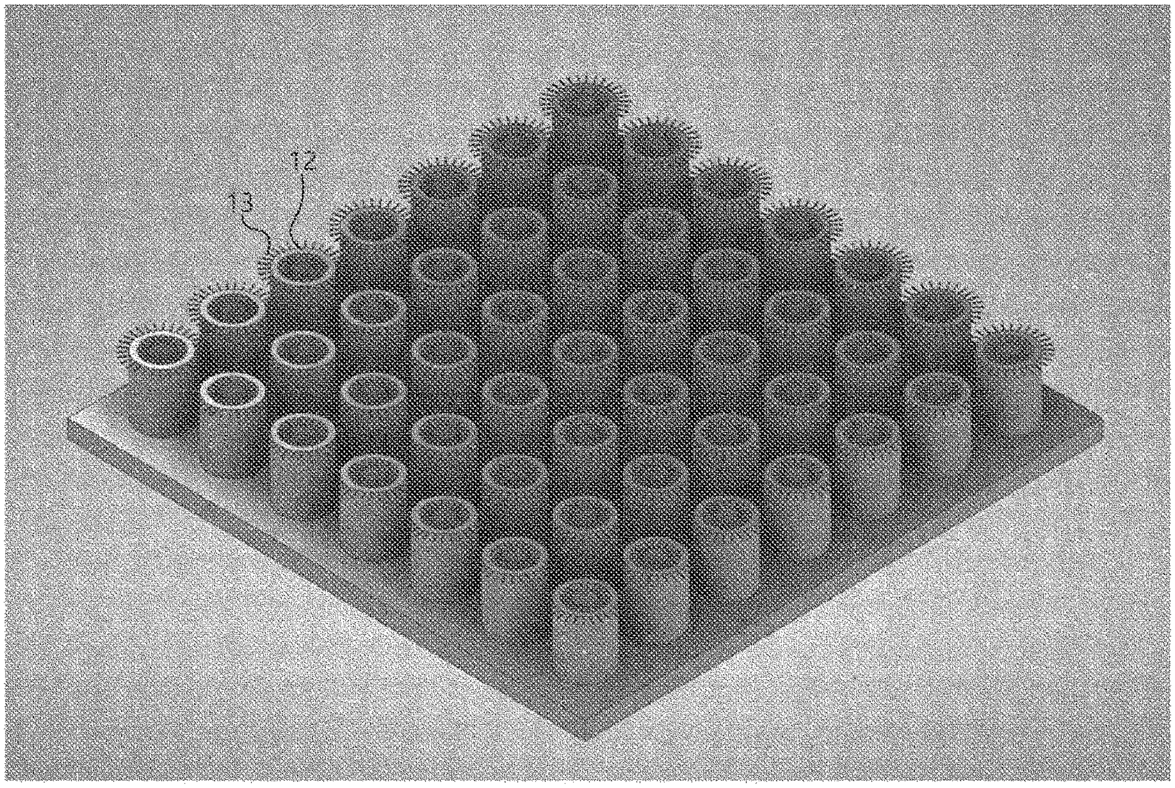

[Figure 15]
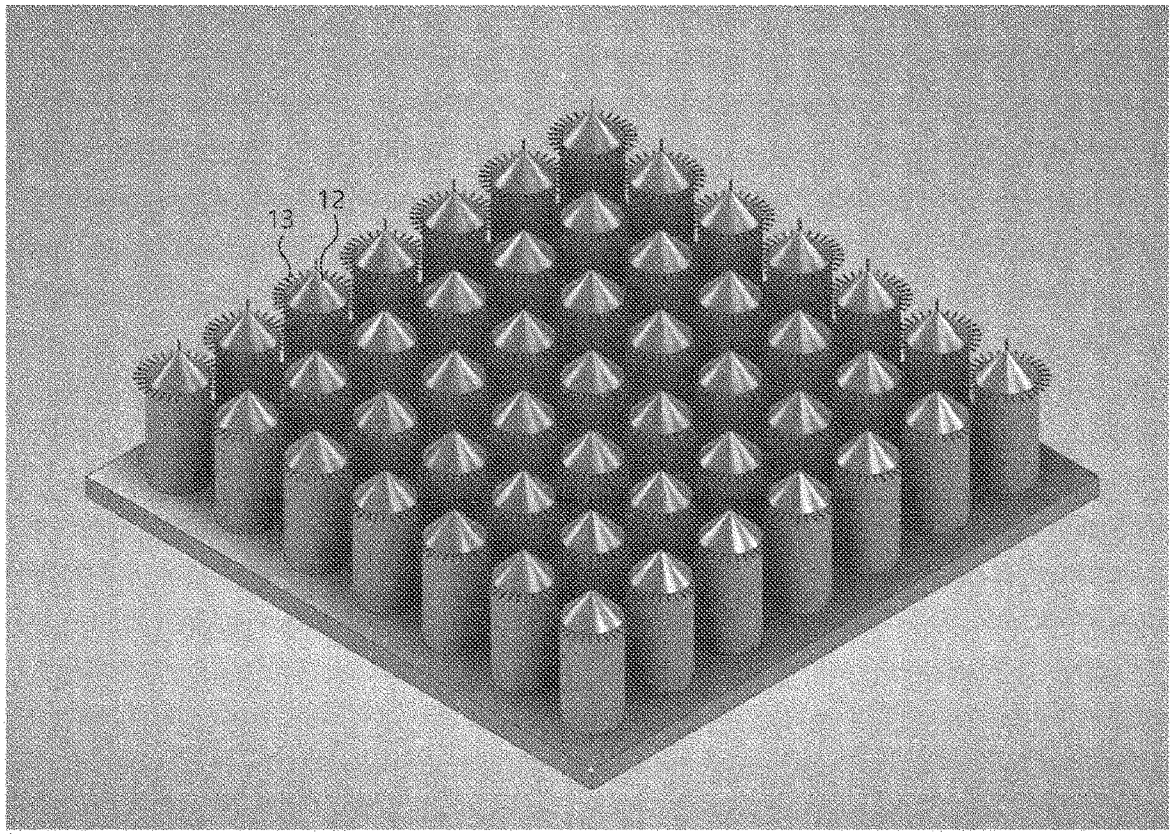
[Figure 16]
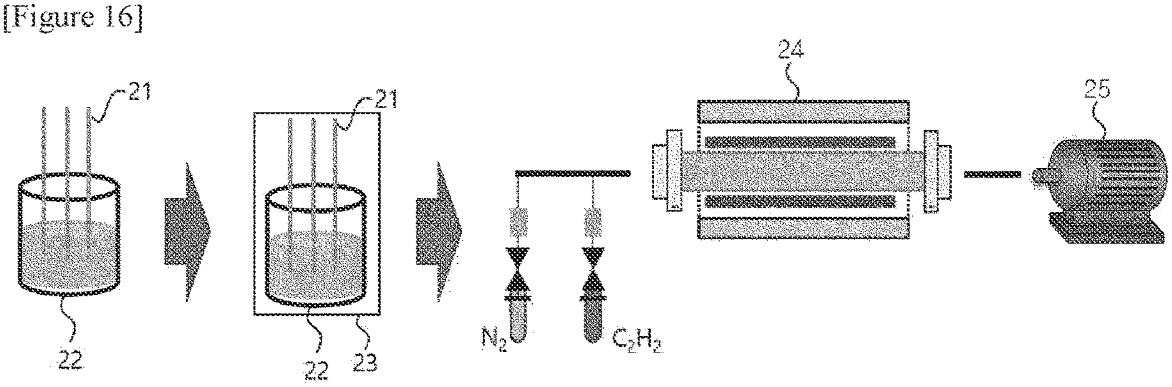

[Figure 17]
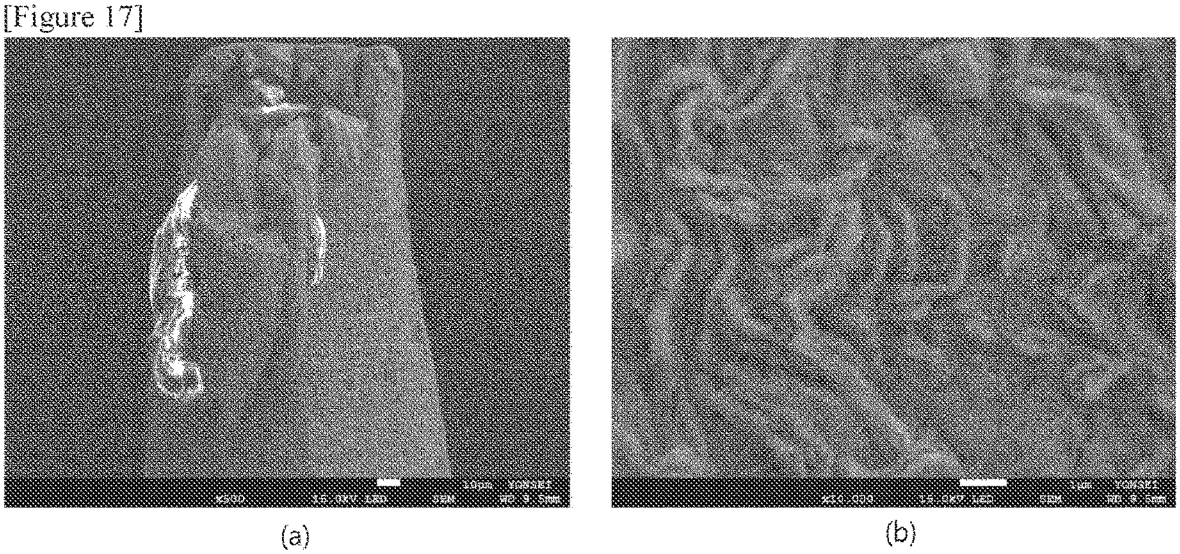
(a) (b)
[Figure 18]
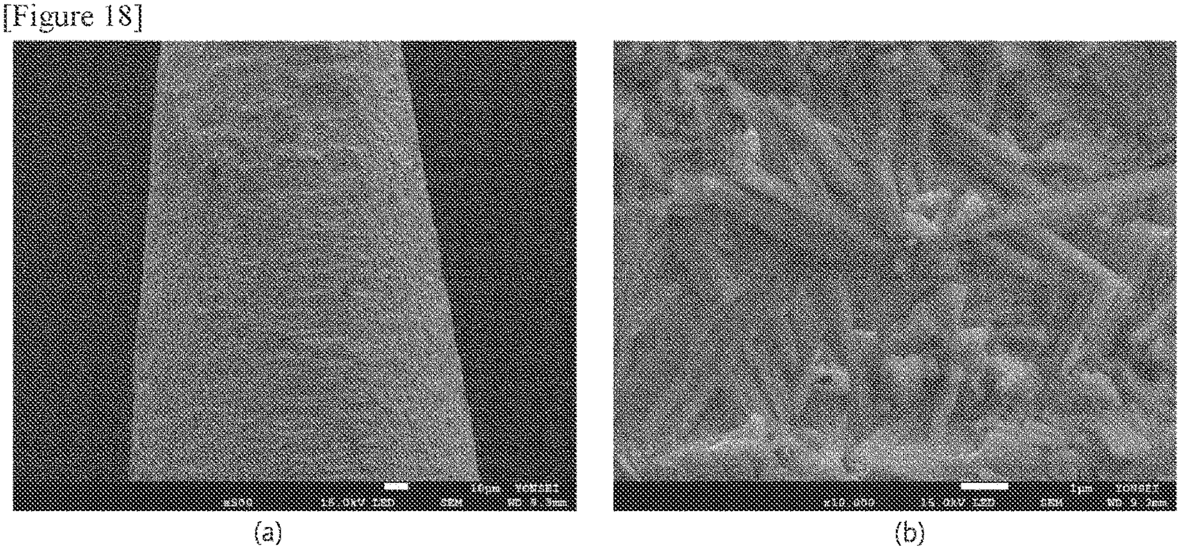
(a) (b)

[Figure 19]
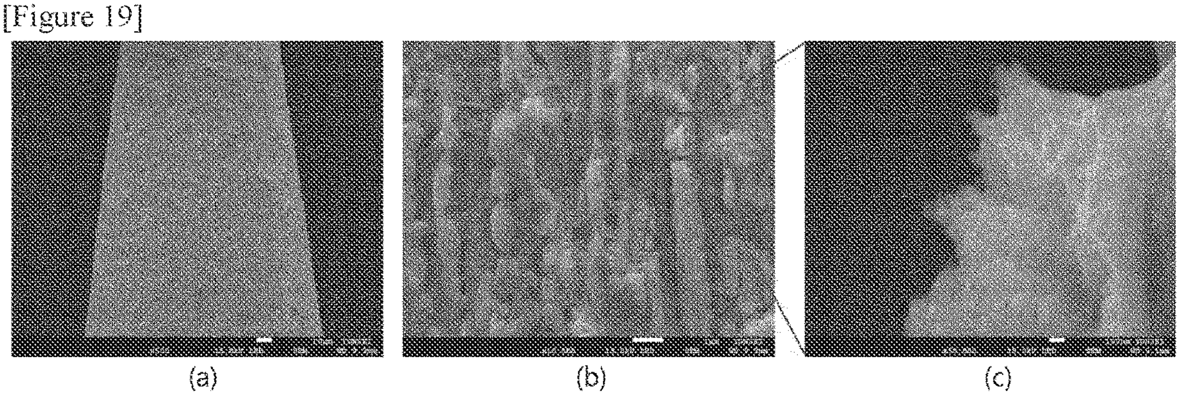
(a) (b) (c)
[Figure 20]
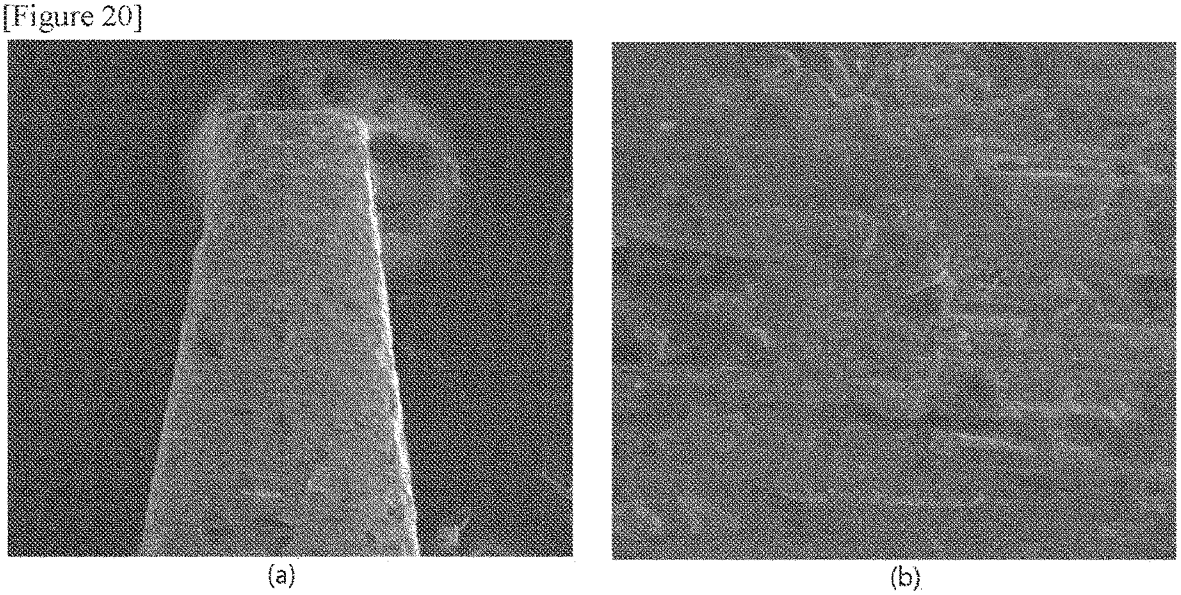
(a) (b)

[Figure 21]
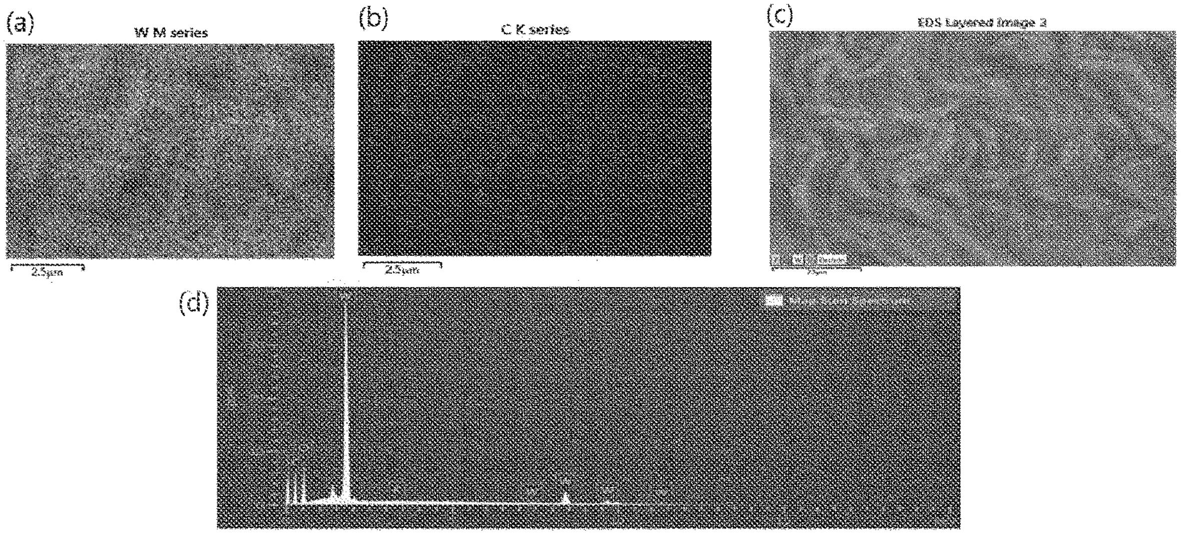
[Figure 22]
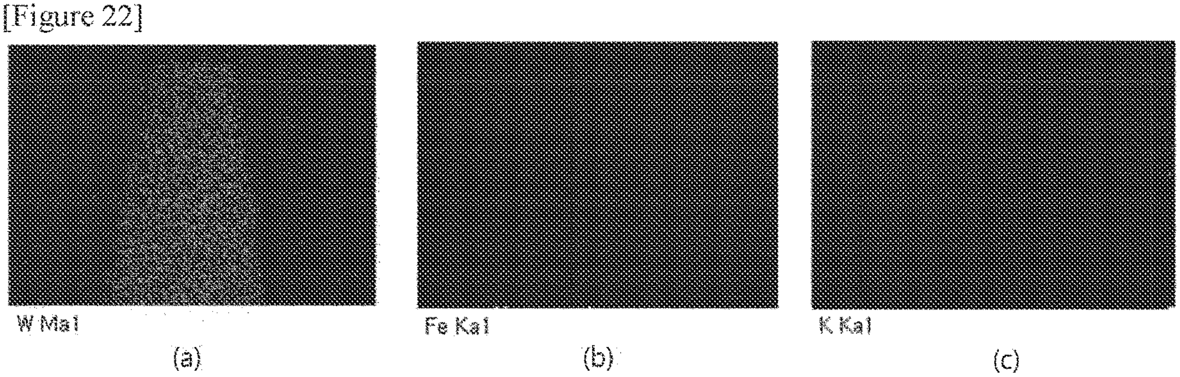
[Figure 23]
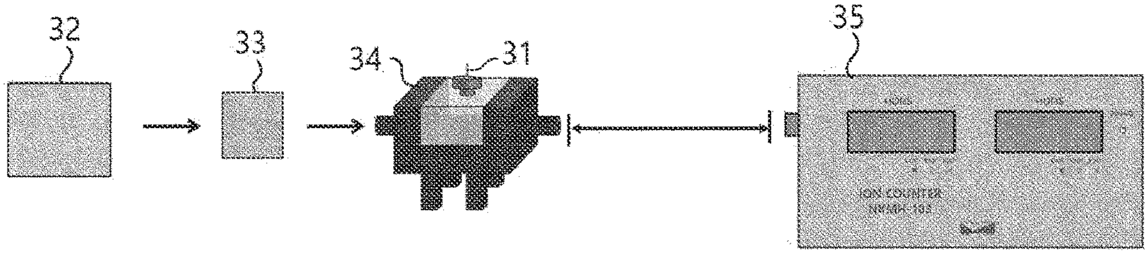

[Figure 24]
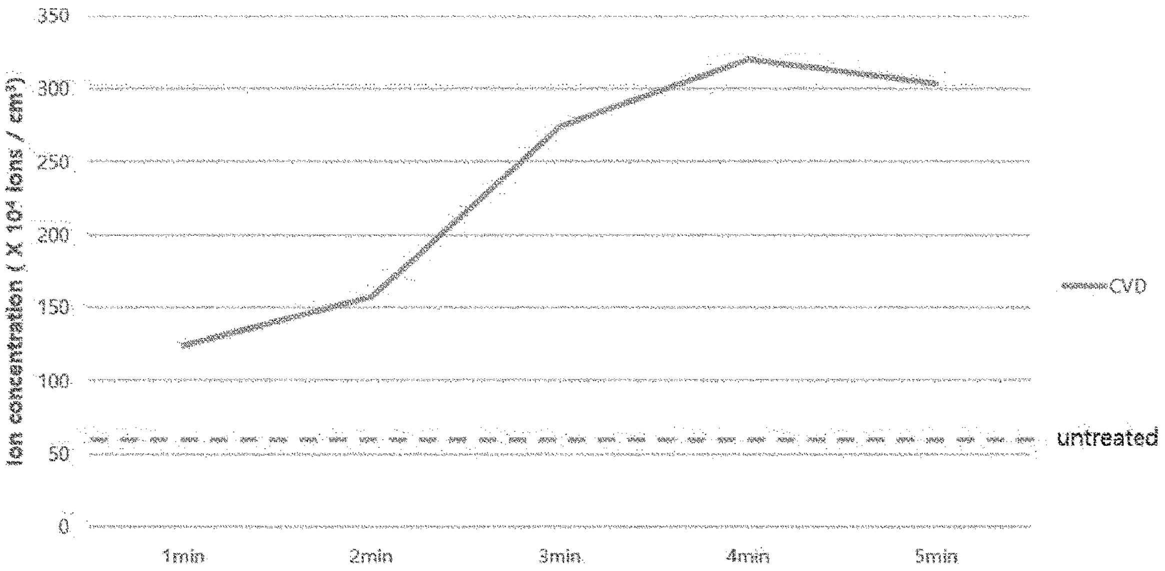
[Figure 25]
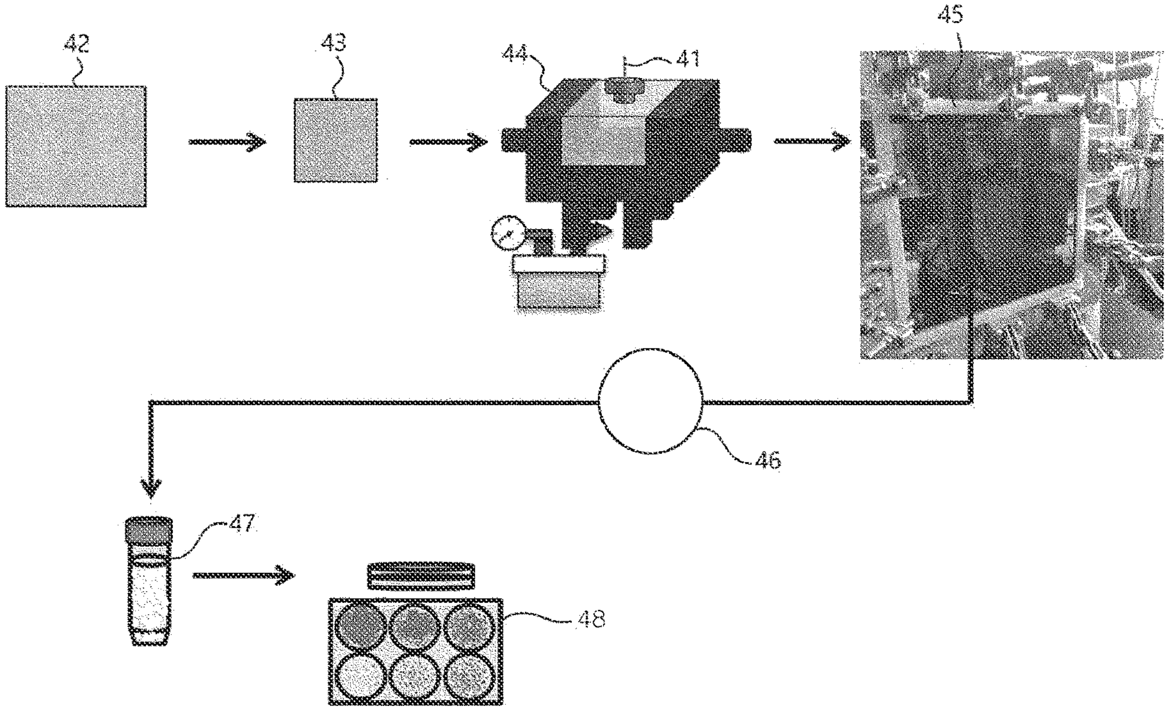

[Figure 26]
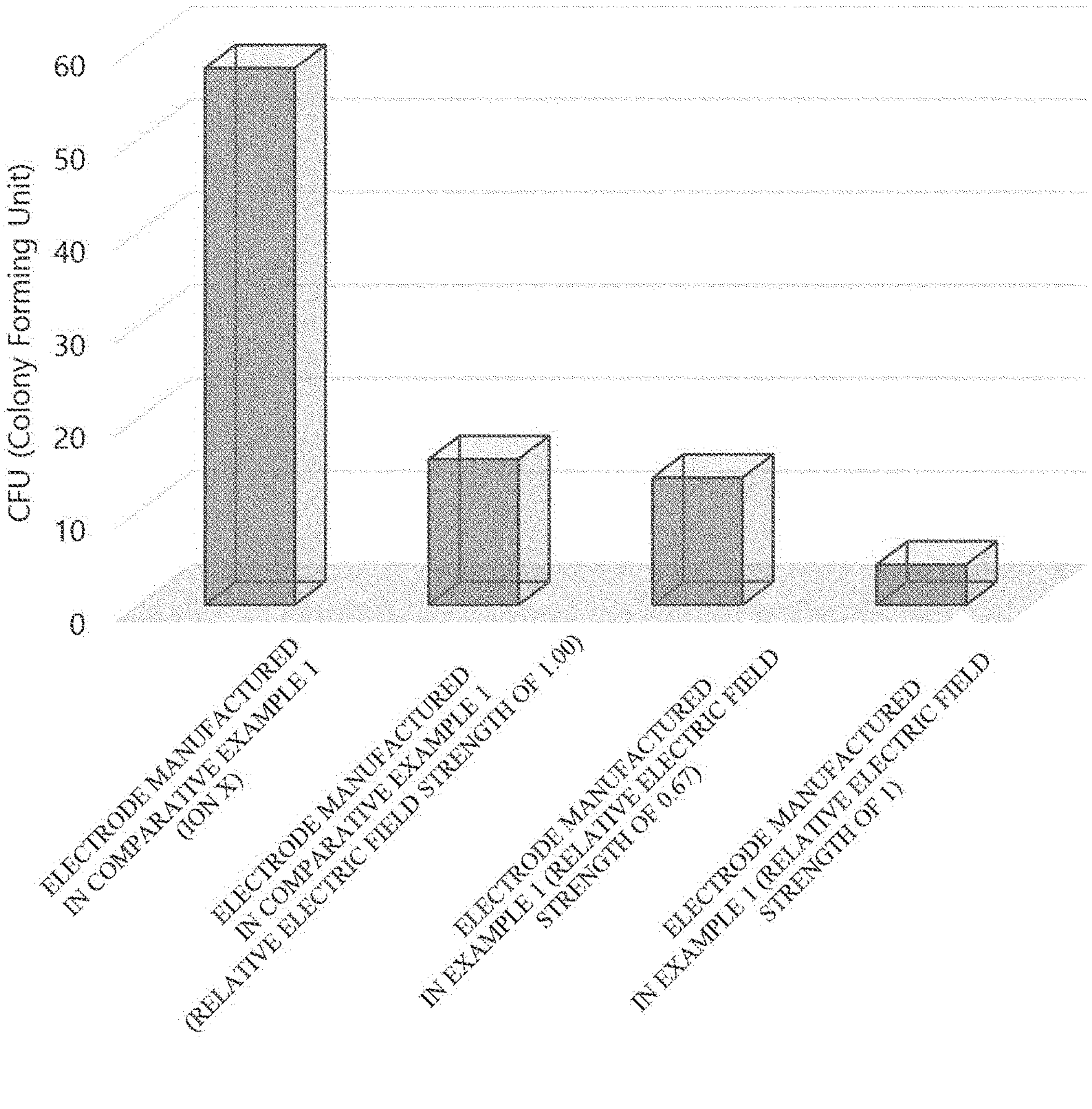

[Figure 27]
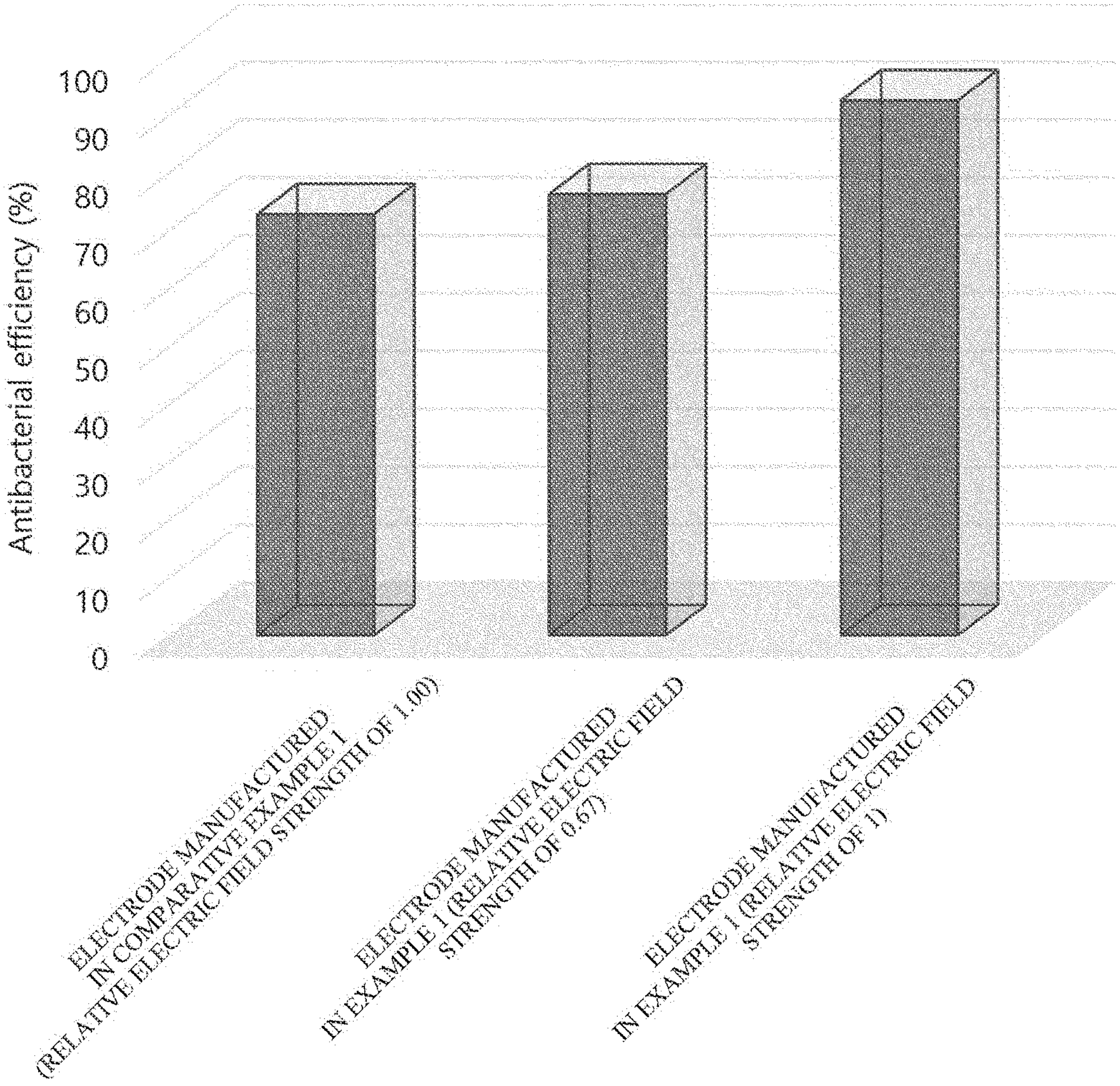

[Figure 28]
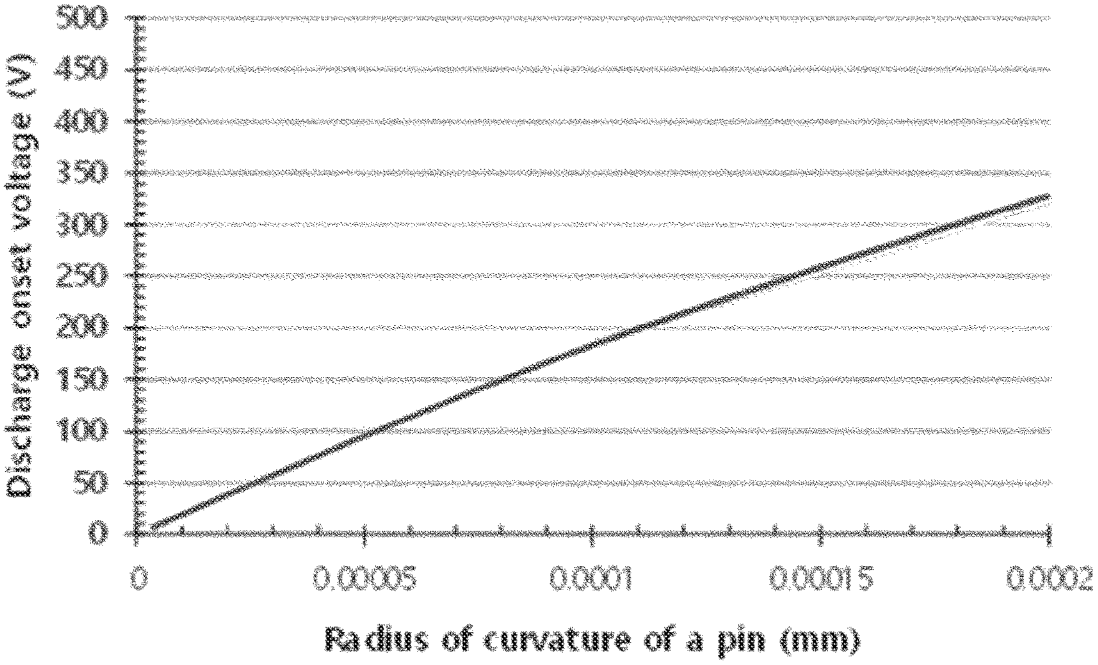
[Figure 29]
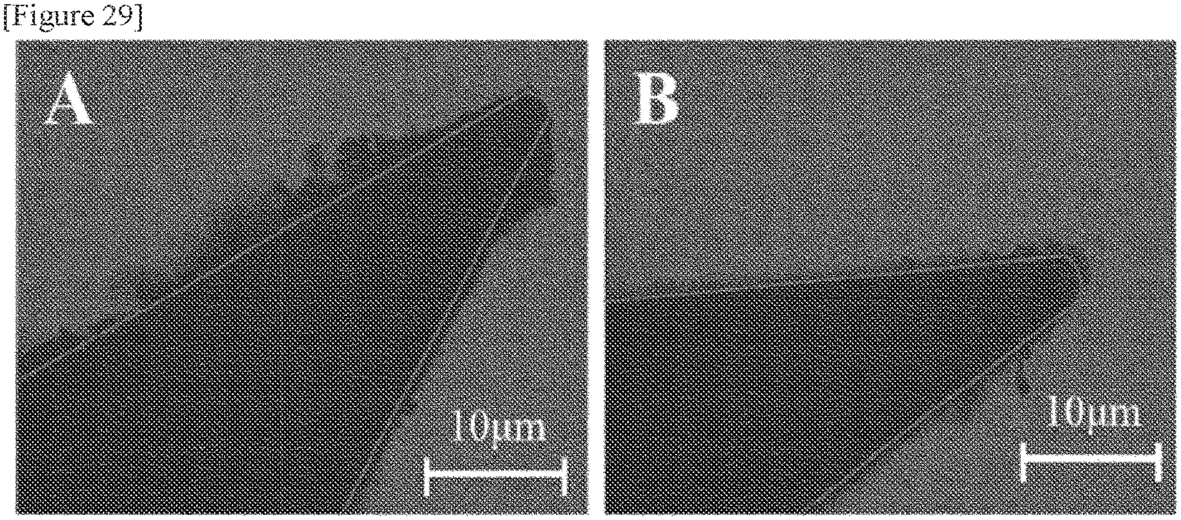

[Figure 30]
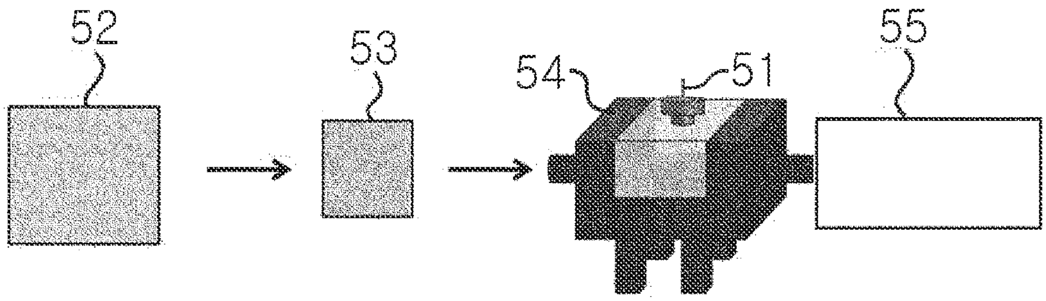

ELECTRODE, METHOD FOR PREPARING SAME, AND ELECTROSTATIC DISCHARGE SYSTEM COMPRISING SAME

RELATED APPLICATIONS

This application is a National Phase of PCT Patent Application No. PCT/KR2022/010996 having International filing date of Jul. 26, 2022, which claims the benefit of priority of Korean Patent Application Nos. 10-2022-0092791 filed on Jul. 26, 2022 and 10-2021-0112629 filed on Aug. 25, 2021. The contents of the above applications are all incorporated by reference as if fully set forth herein in their entirety.

FIELD AND BACKGROUND OF THE INVENTION

The present application relates to an electrode, a method of manufacturing the electrode, and an electrostatic discharge system including the electrode.

Electrostatic discharge technologies for improving indoor air quality have been used for mainly collecting electric dust, which replaces a high efficiency particulate air (HEPA) filter shown in FIG. 1, or for anion generation to overcome the shortcomings of local ultraviolet (UV) sterilization shown in FIG. 2. In particular, a new approach to electrostatic discharge technologies is needed to innovatively control bio-fine dust which accounts for one-third of indoor floating pollutants.

In the case of electrostatic discharge technologies, it is essential to design a differentiated electrostatic discharge system to maintain residual ozone concentration below the indoor standard. Accordingly, there is a need for an electrode that may exhibit the above-described effects, a method of manufacturing the electrode, and an electrostatic discharge system including the electrode.

SUMMARY OF THE INVENTION

The present application is directed to providing an electrode in which an anion generation concentration is high, a residual ozone concentration is maintained below an indoor standard, the corrosion of an electrode is prevented, and excellent antibacterial performance is exhibited, a method of manufacturing the electrode, and an electrostatic discharge system including the electrode.

The present application relates to an electrode. According to the exemplary electrode of the present application, an anion generation concentration may be high, a residual ozone concentration may be maintained below an indoor standard, the corrosion of the electrode may be prevented, and excellent antibacterial performance may be exhibited.

In the present specification, the term "nano" may refer to a size on a nanometer (nm) scale, for example, a size of 0.1 nm to 1,000 nm, but the present invention is not limited thereto.

In addition, in the present specification, the term "nano-pin" means that protrusions with an average diameter on a nanometer (nm) scale are formed on a surface of a pin-shaped body. In addition, in the present specification, the term "pin" may refer to a rod-shaped structure of which a length is greater than a cross-sectional area and may refer to a structure having a sharp point of which a diameter is decreased toward an end.

Hereinafter, an electrode of the present application will be described with reference to the accompanying drawings.

The accompanying drawings are illustrative, and the electrode of the present application is not limited to the accompanying drawings.

FIG. 3 is a diagram exemplarily illustrating an electrode according to one embodiment of the present application. As shown in FIG. 3, the electrode includes a body 11, protrusions 12, and a coating portion 13.

The body 11 is a portion that becomes a body of the electrode.

In an example, the body may have a pin shape. Since the body of the electrode has the pin shape, an active area may be expanded when anions are generated, and simultaneously, an ionization discharge onset voltage for generating anions may be lowered, thereby suppressing ozone generation.

The body 11 may be made of an electrode material commonly used in the art. Specifically, the body 11 may include a transition metal including iron, tungsten, silver, copper, gold, nickel, cobalt, zinc, molybdenum, or an alloy thereof.

The protrusion 12 may be a portion that protrudes from a surface of the body 11, may be formed on the surface of the body 11, and may have a nano size. Since the electrode includes the protrusions with the nano size on the surface of the body, an ionization discharge onset voltage required to generate anions may be lowered, and when anions are generated, anions distributed on surfaces of the body and the protrusions are dispersed so that, due to an amount of impact reduced by a slow electron transfer speed formed by the dispersed anions, shell electrons of oxygen atoms are allowed to escape mainly instead of oxygen dissociation, thereby suppressing ozone generation and inducing a shape that increases an amount of generated anions. In addition, the electrode may maintain a residual ozone concentration below an indoor standard.

The plurality of protrusions 12 may be formed on the surface of the body 11, but the number thereof is not particularly limited. In the present specification, the term "plurality" means two or more, and the upper limit is not particularly limited.

In an example, the protrusion 12 may have a radius of curvature of 1 nm to 10 μm. Specifically, the radius of curvature of the protrusion 12 may be in a range of 5 nm to 8 μm, 10 nm to 6 μm, 50 nm to 4 μm, or 100 nm to 2 μm. Since the protrusion has a radius of curvature in above-described range, the protrusion 12 can lower an ionization discharge onset voltage for generating anions, thereby lowering electric field strength to suppress ozone generation.

For example, an ionization discharge onset voltage for generating anions in the electrode may be in a range of 0.02 kV to 20 kV, specifically, in a range of 0.05 kV to 18 kV, 0.1 kV to 15 kV, 0.5 kV to 13 kV, or 1 kV to 10 kV. The electrode has an ionization discharge onset voltage for generating anions that satisfies the above-described range, thereby lowering electric field strength to suppress ozone generation.

In this case, an ionization discharge onset voltage $V_s$ for generating anions may be calculated using General Formula 1 below.

$$V_s = \frac{r}{2} \times E \times \ln\left[\frac{r+2d}{r}\right] \quad \text{[General Formula 1]}$$

In General Formula 1, r is a radius of curvature of the protrusion, E is electric field strength when ionization begins to appear on the surfaces of the body and the protrusions to generate anions, and d is a distance between the electrode and a ground plate. In this case, the electric field strength E may be calculated by substituting the ionization discharge onset voltage Vs obtained through actual experiments, the predesignated radius of curvature r of the protrusion, and the distance d between the electrode and the ground plate.

The distance d between the electrode and the ground plate may be in a range of 4 mm to 16 mm in the air. Specifically, the distance d may have a lower limit of 6 mm or more, 8 mm or more, or 10 mm or more, and an upper limit of 14 mm or less, or 12 mm or less. When the distance between the electrode and the ground plate satisfies the above-described range, a voltage applied to generate anions is lowered, thereby lowering electric field strength to suppress ozone generation. However, when the distance between the electrode and the ground exceeds the above-described range, a voltage applied to generate anions may be increased, which may increase electric field strength and may increase ozone generation.

In an example, the protrusion 12 may be integrated with the body 11 through a forming operation to be described below and may be made of the same material as the body 11. For example, the protrusion 12 may include a transition metal including iron, tungsten, silver, copper, gold, nickel, cobalt, zinc, molybdenum, or an alloy thereof.

The coating portion 13 is a portion formed by being applied on the surfaces of the body 11 and the protrusions 12 and is a portion formed by applying conductive carbon on the above-described surfaces. The electrode may include the coating portion formed by applying the conductive carbon on the above-described surfaces, thereby preventing the corrosion of the electrode and exhibiting excellent antibacterial performance.

As an example, the coating portion may be formed in the form of a film or fiber on the surfaces of the body and the protrusions. By having the above-described form, the coating portion may prevent the corrosion of the electrode and may exhibit excellent antibacterial performance.

The conductive carbon may be carbon having conductivity and may be included in the electrode at a content of 10 to 40 parts by weight with respect to 100 parts by weight of the transition metal. Specifically, the conductive carbon may be included in the electrode at a content of 13 to 38 parts by weight, 15 to 35 parts by weight, 18 to 33 parts by weight, 20 to 30 parts by weight, 23 to 28 parts by weight, or 25 to 28 parts by weight with respect to the 100 parts by weight of the transition metal. When the conductive carbon is included in the electrode at the above-described content, an anion generation concentration can be high, a residual ozone concentration can be maintained below an indoor standard, and excellent antibacterial performance can be exhibited.

In an example, a concentration of generated anions measured by supplying air to the electrode at a flow rate of 5 L/min may be $8\times10^5$ ions/$cm^3$ or more. A specific method of measuring an anion generation concentration of an electrode may be performed by measuring an anion generation concentration, which is generated by supplying air at the above-described flow rate and applying a DC negative voltage, for example, a DC negative voltage of 7 kV, by using an anion measuring unit, specifically, an air ion measuring unit, installed at a certain distance, in one embodiment, 3.5 cm. In addition, the anion generation concentration of the electrode measured under the above-described conditions may be, specifically, $9\times10^5$ ions/$cm^3$ or more, $10\times10^5$ ions/$cm^3$ or more, $11\times10^5$ ions/$cm^3$ or more, or $12\times10^5$ ions/$cm^3$ or more. In addition, an upper limit of the anion generation concentration of the electrode measured under the above-described conditions may be $1\times10^8$ ions/$cm^3$ or less, $5\times10^7$ ions/$cm^3$ or less, $1\times10^7$ ions/$cm^3$ or less, $5\times10^6$ ions/$cm^3$ or less, $4\times10^6$ ions/$cm^3$ or less, $35\times10^5$ ions/$cm^3$ or less, or $33\times10^5$ ions/$cm^3$ or less. When the anion generation concentration of the electrode measured under the above-described conditions satisfies the above-described range, the electrode can allow the anion generation concentration to be high and a residual ozone concentration to be maintained below an indoor standard. In this case, since the anion measuring unit is installed at the above-described certain distance from a portion at which anions are generated, the anion may be measured after having sufficiently diffused in the air, thereby increasing measurement reliability. On the other hand, when the anion generating unit is installed at a distance that is shorter than the above-described certain distance from the portion at which anions are generated, there may be a disadvantage in that there is a risk that electric field interference occurs between the two portions to cause an arc.

In another example, a residual rate of bacteria, which is measured by injecting air including anions generated under the above-described conditions into a 22 L chamber together with 2,000 bacteria/$cm^3$ of the bacteria to expose the bacteria to the anions, may be 25% or less, specifically, 24% or less. In addition, a lower limit of the residual rate of the bacteria measured under the above-described conditions is not particularly limited, but may be, for example, 0% or more, 3% or more, 5% or more, 8% or more, or 10% or more. The electrode may exhibit excellent antibacterial performance because the residual rate of the bacteria measured under the above-described conditions satisfies the above-described range.

In this case, Gram-positive bacteria may be used as the bacteria because the Gram-positive bacteria generally have higher antimicrobial resistance than Gram-negative bacteria. Specifically, *Staphylococcus aureus, Diplococcus pneumoniae, Streptococcus lactis, Lactobacillus bulgaricus, Bacillus subtilils, Clostridium tetani,* or the like may be used.

In still another example, the residual number of bacteria, which is measured by injecting air including anions generated under the above-described conditions into a 22 L chamber together with 2,000 bacteria/cm3 of the bacteria to expose the bacteria to the anions, may be 12 colony forming unit (CFU) or less, specifically, 11 CFU or less. In addition, a lower limit of the residual number of the bacteria measured under the above-described conditions is not particularly limited, but may be, for example, 0 CFU or more, 1 CFU or more, 2 CFU or more, or 3 CFU or more. The electrode may exhibit excellent antibacterial performance because the residual number of the bacteria measured under the above-described conditions satisfies the above-described range. In this case, as the bacteria, in view of the above, the above-described Gram-positive bacteria may be used.

In yet another example, when anions are generated under the above-described conditions, a residual ozone concentration of the electrode may be less than 50 ppb, specifically, 45 ppb or less or 40 ppb or less. When anions are generated under the above-described conditions, the electrode has a residual ozone concentration in the above-described range, thereby maintaining a residual ozone concentration below an indoor standard and exhibiting excellent antibacterial performance.

In addition, an electric field applied to the electrode when anions are generated under the above-described conditions may be in a range of 500 V/m to 500,000 V/m. Specifically, the electric field applied to the electrode when anions are generated under the above-described conditions may be in a range of 1,000 V/m to 300,000 V/m or 5,000 V/m to 200,000 V/m. Since the electrode generates anions with an electric field in the above-described range, an anion generation concentration may be high, a residual ozone concentration may be maintained below an indoor standard, and excellent antibacterial performance may be exhibited.

The present application also relates to a method of manufacturing an electrode. The method of manufacturing an electrode relates to a method of manufacturing the above-described electrode, and the above-described contents of the electrode may be equally applied to the specific details of the electrode to be described below.

The method of manufacturing an electrode includes a forming operation and a coating operation.

The forming operation is an operation of forming an electrode and is performed by forming protrusions having a nano size on a surface of a body. Since the electrode is formed in the above-described way, an ionization discharge onset voltage for generating anions may be lowered, thereby lowering electric field strength to suppress ozone generation.

In an example, the forming operation may be performed through etching. Specifically, the etching may be performed through at least one selected from wet etching, optical etching, and physical etching. The forming operation may be performed through the above-described etching so that the protrusions may be formed on the surface of the body through a simple process.

In an example, wet etching may be used in the forming operation. The wet etching may be performed by immersing the body in an etching solution and then applying ultrasonic waves. By using the wet etching in the formation operation, a process can be easily performed and manufacturing costs according to the process can be reduced.

For example, due to ease of application, low price, and guaranteed performance, a single solution or a mixed solution based on a strong acid such as HCl, $H_2SO_2$, HF or a strong base such as NaOH may be used as the etching solution, and a commercially available etching solution for tungsten, stainless, or nickel may be used.

In addition, an application time of the ultrasonic waves may be in a range of 10 seconds to 1 hour. Specifically, the application time of the ultrasonic waves may be in a range of 20 seconds to 45 minutes, 30 seconds to 30 minutes, 40 seconds to 15 minutes, 1 minute to 10 minutes, or 1 minute to 5 minutes. When the application time of the ultrasonic waves during the wet etching satisfies the above-described range, it is possible to manufacture an electrode which has a high anion generation concentration and maintains a residual ozone concentration below an indoor standard.

In another embodiment, photo lithography or laser lithography may be used as the optical etching. FIGS. 4 to 9 are diagrams exemplarily illustrating an electrode manufactured using a laser lithography process according to another embodiment. In addition, FIGS. 10 to 15 are diagrams exemplarily illustrating an electrode manufactured using a laser lithography process according to still another embodiment. As shown in FIGS. 4 to 15, the electrode may have a structure in which regular protrusions 12 having various shapes are formed on a body (not shown).

In another example, the forming operation may be performed through attaching. The attaching may be performed by attaching catalyst particles to a surface of the body. FIG. 16 is a diagram exemplarily illustrating an electrode in which catalyst particles are attached to a surface of a body according to another embodiment of the present application. As shown in FIG. 16, the forming operation may be performed through the above-described attaching, thereby forming the protrusions 12 on a surface of a body 11.

For example, as the catalyst particles, a transition metal may be used. For example, a transition metal including iron, tungsten, silver, copper, gold, nickel, cobalt, zinc, molybdenum, or an alloy thereof may be used. The specific details of use of a transition metal as the catalyst particles are the same as those described in the protrusions and thus will be omitted.

In addition, a size of the catalyst particles may be a nano size. Since the catalyst particles have a nano size, when anions are generated, an active area may be expanded. On the other hand, when the size of the catalyst particles exceeds the nano size, an area covering the body increases, and during coating, for example, during coating using a chemical vapor deposition method, the catalyst particles may limitedly function as a catalyst.

In another example, the attaching may be additionally performed after the etching is performed. That is, additional protrusions may be formed by performing the attaching between the protrusions formed on the body through the above-described etching.

The coating operation is an operation of forming a coating portion on a surface of the electrode and is performed by applying conductive carbon on surfaces of the body and protrusions included in the electrode. The conductive carbon may be applied on the surfaces of the body and the protrusions so that corrosion of the electrode may be prevented, and the electrode may exhibit excellent antibacterial performance.

In an example, the coating operation may be performed through one method selected from a chemical vapor deposition method, a sputtering method, an atomic layer deposition method, a spray coating method, and a spin coating method.

In one embodiment of the present application, the coating operation may be performed through the chemical vapor deposition method. By using the chemical vapor deposition method in the coating operation, technical and cost thresholds can be lowered.

For example, as shown in FIGS. 4 to 9, a coating portion 13 may be formed in the form of a film on the surfaces of the body (not shown) and the protrusions 12 through the above-described method. In addition, as shown in FIGS. 10 to 15, the coating portion 13 may be formed in the form of fiber on the surfaces of the body (not shown) and the protrusions 13 through the above-described method. By having the above-described form, the coating portion may prevent the corrosion of the electrode and may exhibit excellent antibacterial performance.

In the electrode manufactured through the above-described method, a residual rate of bacteria, which is measured by supplying air at a flow rate of 5 L/min to generate anions, and injecting air including the generated anions into a 22 L chamber together with 2,000 bacteria/$cm^3$ of the bacteria to expose the bacteria to the anions, may be 25% or less. The detailed description of the residual rate of the bacteria measured according to anions of the electrode generated under the above-described conditions is the same as the above description and thus will be omitted. Since the residual rate of the bacteria measured according to the anions of the electrode generated under the above-described conditions satisfies the above-described range, excellent antibacterial performance may be exhibited.

The present application also relates to an electrostatic discharge system. The electrostatic discharge system relates to an electrostatic discharge system including the above-described electrode, and the above-described contents of the electrode may be equally applied to the specific details of the electrode to be described below.

The electrostatic discharge system includes the above-described electrode. Since the electrostatic discharge system includes the above-described electrode, an anion generation concentration may be high, a residual ozone concentration may be maintained below an indoor standard, the corrosion of the electrode may be prevented, and excellent antibacterial performance may be exhibited. As other configurations of the electrostatic discharge system, configurations commercially available in the art may be used. The configurations are not particularly limited as long as the configurations include the above-described electrode.

According to an electrode, a method of manufacturing the electrode, and an electrostatic discharge system including the electrode according to the present application, an anion generation concentration may be high, a residual ozone concentration may be maintained below an indoor standard, the corrosion of the electrode may be prevented, and excellent antibacterial performance may be exhibited.

BRIEF DESCRIPTION OF THE SEVERAL VIEWS OF THE DRAWINGS

FIG. 1 is a diagram illustrating a high efficiency particulate air (HEPA) filter included in a conventional electrostatic system.

FIG. 2 is a diagram illustrating an ultraviolet (UV) sterilizer included in the conventional electrostatic system.

FIG. 3 is a diagram exemplarily illustrating an electrode according to one embodiment of the present application.

FIGS. 4 to 9 are diagrams exemplarily illustrating an electrode manufactured using a laser lithography process according to another embodiment.

FIGS. 10 to 15 are diagrams exemplarily illustrating an electrode manufactured using a laser lithography process according to another embodiment.

FIG. 16 is a diagram illustrating an exemplary apparatus for manufacturing an electrode according to one embodiment of the present application.

FIG. 17 shows a low magnification image (left, ×500) and a high magnification image (right, ×10000) captured by photographing an electrode manufactured in Example 1 using a scanning electron microscope.

FIG. 18 shows a low magnification image (left, ×500) and a high magnification image (right, ×10000) captured by photographing an electrode manufactured in Example 3 using a scanning electron microscope.

FIG. 19 shows a low magnification image (left, ×500), a high magnification image (middle, ×10000), and an ultra-high magnification image (right, ×50000) captured by photographing an electrode manufactured in Example 5 using a scanning electron microscope.

FIG. 20 shows a low magnification image (left, ×500) and a high magnification image (right, ×10000) captured by photographing an electrode manufactured in Comparative Example 1 using a scanning electron microscope.

FIG. 21 shows energy dispersive X-ray spectroscopy elemental map images (top) and a graph (bottom) for the electrode manufactured in Example 1.

FIG. 22 shows energy dispersive X-ray spectroscopy elemental map images for the electrode manufactured in Comparative Example 1.

FIG. 23 is a diagram exemplarily illustrating an anion concentration evaluation apparatus for measuring an anion generation concentration of electrodes manufactured in Examples 1 to 5 and the electrode manufactured in Comparative Example 1.

FIG. 24 is a graph showing an anion concentration of the electrodes manufactured in Examples 1 to 5 and the electrode manufactured in Comparative Example 1.

FIG. 25 is a diagram exemplarily illustrating an antibiosis evaluation apparatus for evaluating the residual number of cells and antibacterial efficiency according to relative electric field strength of the electrode manufactured in Example 1 and the electrode manufactured in Comparative Example 1.

FIG. 26 is a graph showing the residual number of cells according to relative electric field strength of the electrode manufactured in Example 1 and the electrode manufactured in Comparative Example 1.

FIG. 27 is a graph showing the antibacterial efficiency of cells according to relative electric field strength of the electrode manufactured in Example 1 and the electrode manufactured in Comparative Example 1.

FIG. 28 is a graph showing an ionization radius onset voltage according to a radius of curvature of a protrusion of the electrodes manufactured in Examples 1 to 5 and the electrode manufactured in Comparative Example 1.

FIG. 29 shows low magnification images (×500) captured by photographing the protrusion of the electrode manufactured in Example 1 using a scanning electron microscope.

FIG. 30 is a diagram exemplarily illustrating a residual ozone concentration evaluation apparatus for measuring a residual ozone concentration according to the electrodes manufactured in Examples 1 to 5 and the electrode manufactured in Comparative Example 1.

DESCRIPTION OF SPECIFIC EMBODIMENTS OF THE INVENTION

Hereinafter, the above contents will be described in more detail with reference to Examples and Comparative Example. However, the scope of the present application is not limited to the contents disclosed below.

Example 1: Manufacturing of Electrode

FIG. 16 is a diagram illustrating an exemplary apparatus for manufacturing an electrode according to one embodiment of the present application. An electrode was manufactured using the apparatus shown in FIG. 16. Specifically, an electrode 21 with a nano-pin shape including tungsten (tungsten pin manufactured by American Elements) was immersed into a beaker 22 containing an etching solution (667498 manufactured by Sigma-Aldrich), and then the beaker 22 was immersed in an ultrasonic bath 23 filled with water to generate ultrasonic waves for 1 minute, thereby forming protrusions on a surface of a body.

Thereafter, an electrode in which the protrusions were formed on the surface of the body having a nano-pin shape was put into a chemical vapor deposition chamber 24, 100 mL/min of nitrogen ($N_2$) was injected into the vapor deposition chamber 24 under conditions of 2 Torr and 20° C./min for 20 minutes, a temperature of the chemical vapor deposition chamber 24 was raised to 650° C. for 70 minutes, acetylene ($C_2H_2$) was injected into the vapor deposition chamber 24 at a rate of 30 mL/min for 10 minutes to cause a reaction for 50 minutes, and then the vapor deposition chamber 24 was naturally cooled to manufacture an electrode in which carbon was applied on surfaces of the body and the protrusions. In this case, a pressure in the vapor deposition chamber 24 may be controlled by a vacuum pump 25, and a radius of curvature of the protrusion may be 2 μm or less. In addition, low magnification images (×500) were captured by photographing the protrusions of the electrode manufactured in Example 1 using a scanning electron microscope (SEM, S-4800 manufactured by Hitachi, Ltd., Japan). Results thereof are shown in FIG. 29.

Example 2: Manufacturing of Electrode

An electrode was manufactured in the same manner as in Example 1, except that an electrode with a nano-pin shape including tungsten was immersed in a beaker containing an etching solution, and then ultrasonic waves were generated for 2 minutes to form protrusions on a surface of a body. In this case, a radius of curvature of the protrusion may be 1 μm or less.

Example 3: Manufacturing of Electrode

An electrode was manufactured in the same manner as in Example 1, except that an electrode with a nano-pin shape including tungsten was immersed in a beaker containing an etching solution, and then ultrasonic waves were generated for 3 minutes to form protrusions on a surface of a body. In this case, a radius of curvature of the protrusion may be 500 nm or less.

Example 4: Manufacturing of Electrode

An electrode was manufactured in the same manner as in Example 1, except that an electrode with a nano-pin shape including tungsten was immersed in a beaker containing an etching solution, and then ultrasonic waves were generated for 4 minutes to form protrusions on a surface of a body. In this case, a radius of curvature of the protrusion may be 300 nm or less.

Example 5: Manufacturing of Electrode

An electrode was manufactured in the same manner as in Example 1, except that an electrode with a nano-pin shape including tungsten was immersed in a beaker containing an etching solution, and then ultrasonic waves were generated for 5 minutes to form protrusions on a surface of a body. In this case, a radius of curvature of the protrusion may be 100 nm or less.

Comparative Example 1: Manufacturing of Electrode

An electrode with a nano-pin shape including tungsten of Example 1, in which a protrusion and a coating portion were not formed, was manufactured. In this case, the electrode manufactured in Comparative Example 1 does not include the protrusion, and a radius of curvature of a sharp portion at an upper end portion of a body may be 100 μm.

Experimental Example 1: Evaluation of Electrode Surface Shape and Composition

Surface shapes of the electrodes manufactured in Examples 1, 3, and 5 and the electrode manufactured in Comparative Example 1 were photographed using a SEM (S-4800 manufactured by Hitachi, Ltd., Japan) to capture low and high magnification images. Results thereof are shown in FIGS. 17 to 20.

In addition, compositions of the electrode manufactured in Example 1 and the electrode manufactured in Comparative Example 1 were observed using energy dispersive X-ray spectroscopy (EDX, S-4800 manufactured by Hitachi, Ltd., Japan). Results thereof are shown in FIGS. 21 and 22 and Table 1 below. In this case, since carbon tape is used to fix the electrode manufactured in Example 1 and the electrode manufactured in Comparative Example 1, a content of carbon is a content including a content of the carbon tape. In addition, contents of oxygen and potassium are contents due to an etching process.

TABLE 1

| | Example 1 | Comparative Example 1 |
|---|---|---|
| W | 68.18 wt % | 100 wt % |
| C | 18.85 wt % | 0 wt % |
| O | 12.82 wt % | 0 wt % |
| Fe | 0 wt % | 0 wt % |
| K | 0.20 wt % | 0 wt % |

As shown in FIGS. 17 to 22 and Table 1, it was confirmed that, unlike the electrode manufactured in Comparative Example 1, the electrodes manufactured in Examples 1, 3, and 5 had a nano-pin-shaped body, and at the same time, a carbon component was included in the protrusions.

Experimental Example 2: Evaluation of Anion Generation Concentration of Electrode An anion generation concentration of the electrodes manufactured in Examples 1 to 5 and the electrode manufactured in Comparative Example 1 was evaluated using the anion concentration evaluation apparatus of FIG. 23. Specifically, as shown in FIG. 23, an electrode 31 manufactured in each of Examples 1 to 5 and Comparative Example 1 was positioned on an anion generating unit 33, a flow rate adjusting unit 33 was used to supply air at a flow rate of 5 L/min from an air supply unit 32 to the anion generating unit 34, and a DC negative voltage of 7 kV was applied to each of the electrodes manufactured in Examples 1 to 5 and the electrode manufactured in Comparative Example 1 to generate anions. Afterwards, an anion measuring unit 35, which was installed at a distance of 3.5 cm from the anion generating unit 34 and uses an air ion meter (NKMH-103 manufactured by Meiko Sangyo Co., Ltd., Japan), was used to measure a concentration of anions generated in the anion generating unit 34. Results thereof are shown in FIG. 24. In this case, applied electric field strength may be 200,000 V/m.

As shown in FIG. 24, it was confirmed that a concentration of anions generated in the electrodes manufactured in Examples 1 to 5 was higher than a concentration of anions generated in the electrode manufactured in Comparative Example 1. In particular, the concentration of anions generated in the electrode manufactured in Example 4 was $32\times10^5$ ions/$cm^3$ which was confirmed to be 6 times or more higher than the concentration of anions generated in the electrode manufactured in Comparative Example 1.

Experimental Example 3: Evaluation of Antibiosis of Electrode

The antibiosis evaluation apparatus of FIG. 25 was used to evaluate the residual number of cells and antibacterial efficiency according to relative electric field strength of the electrode manufactured in Example 1 and the electrode manufactured in Comparative Example 1. Results thereof are shown in FIGS. 26 and 27, respectively. Specifically, as shown in FIG. 25, an electrode 41 manufactured in each of Examples 1 to 5 and Comparative Example 1 was positioned on an anion generating unit 44, a flow rate adjusting unit 43 was used to supply air at a flow rate of 5 L/min from an air supply unit 42 to the anion generating unit 44, and a DC negative voltage of 7 kV was applied to each of the electrodes manufactured in Examples 1 to 5 and the electrode manufactured in Comparative Example 1 to generate anions. Thereafter, air containing anions is injected into a 22 L chamber 45 together with 2,000 bacteria/$cm^3$ of *Staphylococcus aureus* to expose the *Staphylococcus aureus* to the anions, and then the *Staphylococcus aureus* was collected through a button sampler 46 (manufactured by SKC, Inc., USA). Thereafter, the *Staphylococcus aureus* collected in the button sampler 46 is dispersed in a buffer solution 47 and then smeared and cultured in a medium 48 to count the residual number of bacteria (CUF) according to the presence or absence of anions, thereby calculating antibacterial efficiency to calculate a residual rate of the *Staphylococcus aureus*.

As shown in FIG. 26, it was confirmed that, when an electric field was applied to the electrode manufactured in Example 1 and the electrode manufactured in Comparative Example 1, and thus anions were present, the residual number of the bacteria was smaller as compared with a case in which an electric field was not applied to the electrode manufactured in Comparative Example 1, and thus anions were not present. In addition, as shown in FIG. 27, it was confirmed that, as compared with a case in which an electric field is applied to the electrode manufactured in Comparative Example 1, the antibacterial efficiency was higher when anions were present by the electrode manufactured in Example 1, in which electric field strength was reduced to a level of ⅔. That is, it was confirmed that, when an electric field was applied to the electrode manufactured in Example 1, and thus anions were present, the residual rate of the bacteria was lower than when an electric field was not applied to the electrode manufactured in Comparative Example 1, and thus anions were not present.

Experimental Example 4: Evaluation of Ionization Discharge Onset Voltage According to Radius of Curvature of Protrusion An ionization radius onset voltage according to a radius of curvature of a protrusion of each of the electrodes manufactured in Examples 1 to 5 and a radius of curvature of an upper end portion of a body of the electrode manufactured in Comparative Example 1 were calculated using General Formula 1 below. Results thereof are shown in FIG. 28. Since the electrode manufactured in Comparative Example 1 did not include the protrusion, a radius of curvature of a sharp portion at the upper end portion of the body was used.

$$V_s = \frac{r}{2} \times E \times \ln\left[\frac{r+2d}{r}\right] \quad \text{[General Formula 1]}$$

In General Formula 1, r is a radius of curvature of the protrusion, E is electric field strength when ionization begins to appear on surfaces of the body and the protrusions to generate anions, and d is a distance between the electrode and a ground plate.

As shown in FIG. 28, it was confirmed that, as the radius of curvature of the protrusion was decreased, the ionization discharge onset voltage for generating anions was lowered. As a result, it was confirmed that as the radius of curvature of the protrusion included in the electrode was decreased, electric field strength was lowered to suppress ozone generation.

Experimental Example 5: Evaluation of Residual Ozone Concentration According to Anion Generation of Electrode A residual ozone concentration of the electrodes manufactured in Examples 1 to 5 and the electrode manufactured in Comparative Example 1 were evaluated using the residual ozone concentration evaluation apparatus of FIG. 30. Specifically, as shown in FIG. 30, the residual ozone concentration evaluation apparatus was designed in the same way as the anion concentration evaluation apparatus, except that, instead of the anion measuring unit 35 of the anion concentration evaluation apparatus shown in FIG. 23, an ozone measuring unit 55 including a sampling probe of a suction-type ozone monitor was installed to be connected to an anion generating unit 54. The residual ozone concentration was measured by measuring ozone present in a portion of the air in the anion generating unit 34.

As a result, it was confirmed that the residual ozone concentration in the electrodes manufactured in Examples 1 to 5 was lower than the residual ozone concentration in the electrode manufactured in Comparative Example 1. In particular, it was confirmed that the residual ozone concentration in the electrode manufactured in Example 1, to which an electric field was applied at electric field strength of ⅔ of that of an electric field applied to the electrode manufactured in Comparative Example 1, was 50 ppb, which was considerably lower than the residual ozone concentration of 130 ppb in the electrode manufactured in Comparative Example 1, to which an electric field was applied at the above-described strength.

DESCRIPTION OF REFERENCE NUMERALS

11: body
12: protrusion
13: coating portion
21, 31, 41, 51: electrode
22: beaker
23: ultrasonic tank
24: chemical vapor deposition chamber
25: vacuum pump
32, 42, 52: air supply unit
33, 43, 53: flow rate control unit
34, 44, 54: anion generating unit
35: anion measuring unit
45: chamber
46: button sampler
47: buffer solution
48: medium
55: ozone measuring unit

The invention claimed is:

1. An electrode comprising:

a body having a pin shape, wherein the pin shape is a structure having a sharp point of which a diameter is decreased toward an end;

a protrusion which has a nano size and is formed on a surface of the body; and a coating portion formed by applying conductive carbon on surfaces of the body and of the protrusion.

2. The electrode of claim 1, wherein a residual rate of bacteria, which is measured by supplying air to the electrode at a flow rate of 5 L/min, applying a DC negative voltage of 7 kV to generate anions, and injecting air including the generated anions into a 22 L chamber with 2,000 bacteria/$cm^3$ of the bacteria to expose the bacteria to the anions, is 25% or less.

3. The electrode of claim 1, wherein a residual number of bacteria, which is measured by supplying air to the electrode at a flow rate of 5 L/min, applying a DC negative voltage of 7 kV to generate anions, and injecting air including the generated anions into a 22 L chamber with 2,000 bacteria/$cm^3$ of the bacteria to expose the bacteria to the anions, is a 12colony-forming unit (CFU) or less.

4. The electrode of claim 1, wherein an anion generation concentration, which is measured by supplying air to the electrode at a flow rate of 5 L/min and applying a DC negative voltage of 7 kV, is $8\times10^5$ ions/$cm^3$ or more.

5. The electrode of claim 4, wherein a residual ozone concentration when anions are generated is less than 50 ppb.

6. The electrode of claim 2, wherein an electric field applied when anions are generated is in a range of 500 V/m to 500,000 V/m.

7. The electrode of claim 1, wherein the body includes a transition metal including iron, tungsten, silver, copper, gold, nickel, cobalt, zinc, molybdenum, or an alloy thereof.

8. The electrode of claim 1, wherein the protrusion has a radius of curvature of 1 nm to 10 μm.

9. The electrode of claim 1, wherein the protrusion includes a transition metal including iron, tungsten, silver, copper, gold, nickel, cobalt, zinc, molybdenum, or an alloy thereof.

10. The electrode of claim 9, wherein the conductive carbon is included at a content of 10 to 40 parts by weight with respect to 100 parts by weight of the transition metal.

11. A method of manufacturing the electrode of claim 1, the method comprising:

a forming operation of forming a protrusion having a nano size on a surface of a body having a pin shape, wherein the pin shape is a structure having a sharp point of which a diameter is decreased toward an end; and a coating operation of applying conductive carbon on surfaces of the body and the protrusion to form a coating portion.

12. The method of claim 11, wherein the forming operation is performed through etching or attaching.

13. The method of claim 12, wherein the etching is performed through at least one selected from wet etching, optical etching, and physical etching.

14. The method of claim 13, wherein the wet etching is performed by immersing the body in an etching solution and then applying ultrasonic waves.

15. The method of claim 14, wherein an application time of the ultrasonic waves is in a range of 10 seconds to 1 hour.

16. The method of claim 12, wherein the attaching is performed by attaching catalyst particles to the surface of the body.

17. The method of claim 16, wherein the catalyst particles include a transition metal including iron, tungsten, silver, copper, gold, nickel, cobalt, zinc, molybdenum, or an alloy thereof.

18. The method of claim 11, wherein the coating operation is performed through one method selected from a chemical vapor deposition method, a sputtering method, an atomic layer deposition method, a spray coating method, and a spin coating method.

19. An electrostatic discharge system comprising the electrode of claim 1.

20. The electrode of claim 1, wherein the coating portion is in a form of a film or a fiber on the surfaces of the body and of the protrusion.

21. The electrode of claim 1, wherein the body and the protrusion are integrally formed of a same transition metal.

22. The electrode of claim 1, wherein the coating portion is a conductive carbon coating formed on the surfaces of the body and of the protrusion by a chemical vapor deposition method using a carbon-containing gas.

23. The method of claim 11, wherein the coating operation is performed by a chemical vapor deposition method using a carbon-containing gas to form the conductive carbon on the surfaces of the body and the protrusion.

24. The electrostatic discharge system of claim 19, further comprising an air supply unit configured to supply air to the electrode and a power source configured to apply a DC negative voltage to the electrode to generate anions.

25. The electrostatic discharge system of claim 24, further comprising a ground plate spaced apart from the electrode by a distance of 4 mm to 16 mm.

* * * * *